(12) United States Patent
Edge et al.

US012279196B2

(10) Patent No.: US 12,279,196 B2
(45) Date of Patent: Apr. 15, 2025

(54) SYSTEMS AND TECHNIQUES TO SUPPORT CELL IDENTIFICATION FOR SATELLITE WIRELESS ACCESS

(71) Applicant: QUALCOMM Incorporated, San Diego, CA (US)

(72) Inventors: Stephen William Edge, Escondido, CA (US); Haris Zisimopoulos, London (GB); Luis Fernando Brisson Lopes, Swindon (GB); Amer Catovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/874,974

(22) Filed: Jul. 27, 2022

(65) Prior Publication Data

US 2023/0053014 A1 Feb. 16, 2023

Related U.S. Application Data

(63) Continuation of application No. 17/670,186, filed on Feb. 11, 2022, now Pat. No. 11,477,632.

(Continued)

(51) Int. Cl.
*H04W 4/00* (2018.01)
*H04B 7/185* (2006.01)
(Continued)

(52) U.S. Cl.
CPC .......... *H04W 4/90* (2018.02); *H04B 7/18558* (2013.01); *H04L 65/1045* (2022.05); *H04L 65/1104* (2022.05); *H04W 84/042* (2013.01)

(58) Field of Classification Search
CPC ..... H04W 4/90; H04W 84/042; H04W 48/18; H04W 84/06; H04W 4/02
See application file for complete search history.

(56) References Cited

U.S. PATENT DOCUMENTS 7,991,382 B1 *  8/2011  Gunasekara ........ H04L 12/6418
                                                          455/456.2
9,185,139 B2 * 11/2015  Holbrook ................ H04L 67/52
(Continued)

FOREIGN PATENT DOCUMENTS

WO  WO-2018006614 A1  1/2018
WO  WO-2020167616 A1  8/2020

OTHER PUBLICATIONS

Ericsson, et al., "Sol#13: Additional Description and Evaluation of Solution #13", 3GPP TSG SA WG2 Meeting #139E, 3GPP Draft, S2-2003687, 3rd Generation Partnership Project (3GPP), Mobile Competence Centre, 650, Route Des Lucioles, F-06921 Sophia-Antipolis Cedex, France, vol. SA WG2, No. Elbonia, Jun. 1, 2020-Jun. 12, 2020, May 22, 2020 (May 22, 2020), XP051889730, 5 Pages, Retrieved from the Internet: URL: https://ftp.3gpp.org/tsg_sa/WG2_Arch/TSGS2_139e_Electronic/Docs/S2-2003687.zip S2-2003687_5GSAT_23737_Sol13_update_and_evaluation.docx [retrieved on May 22, 2020] Section 6.12.2.X.

(Continued)

*Primary Examiner* — Omoniyi Obayanju
(74) *Attorney, Agent, or Firm* — Weaver Austin Villeneuve & Sampson LLP

(57) ABSTRACT

Techniques are described to support call routing and location for a user equipment (UE) with satellite wireless access to a serving PLMN. The UE sends a Session Initiation Protocol (SIP) INVITE message to a network node, such as a P-CSCF, that includes an indication of satellite access for the UE. In response the network node sends a request to another network node for a cell ID for a fixed cell in which the UE is located. The fixed cell can be independent of satellite radio cells for the serving PLMN. The network node may receive the cell ID for the fixed cell and sends the SIP INVITE message to another network node (e.g., an E-CSCF or LRF) with the cell ID for the fixed cell. The other network node (Continued)

may use the cell ID to route the SIP INVITE message or obtain an approximate location of the UE.

28 Claims, 14 Drawing Sheets

Related U.S. Application Data

(60) Provisional application No. 63/150,572, filed on Feb. 17, 2021.

(51) Int. Cl.
*H04L 65/1045* (2022.01)
*H04L 65/1104* (2022.01)
*H04W 4/90* (2018.01)
*H04W 84/04* (2009.01)

(56) References Cited

U.S. PATENT DOCUMENTS

| | | | |
|---|---|---|---|
| 9,756,664 | B2 | 9/2017 | Edge et al. |
| 9,788,181 | B2 | 10/2017 | Edge et al. |
| 11,477,632 | B2 | 10/2022 | Edge et al. |
| 2008/0220728 | A1* | 9/2008 | Seo ............... H04L 65/4061 455/90.2 |
| 2011/0075655 | A1 | 3/2011 | Sahin et al. |
| 2019/0199427 | A1 | 6/2019 | Zakaria et al. |
| 2020/0053539 | A1* | 2/2020 | Panchal ............ H04L 65/1046 |

OTHER PUBLICATIONS

Ericsson: "Sol#12: Handling of Cell ID in Solution #12", 3GPP TSG SA WG2 Meeting #139E, 3GPP Draft, S2-2003688, 3rd Generation Partnership Project (3GPP), Mobile Competence Centre, 650, Route Des Lucioles, F-06921 Sophia-Antipolis Cedex, France, vol. SA WG2, No. Elbonia, Jun. 1, 2020-Jun. 12, 2020, May 22, 2020 (May 22, 2020), XP051889731, 6 Pages, Retrieved from the Internet: URL: https://ftp.3gpp.org/tsg_sa/WG2_Arch/TSGS2_139e_Electronic/Docs/S2-2003688.zip S2-2003688_5GSAT_23737_Sol12_Cell-ID.docx [retrieved on May 22, 2020] Sections 6.12.2.2 and 6.12.4.

International Search Report and Written Opinion—PCT/US2022/016326—ISA/EPO—May 30, 2022.

Qualcomm Incorporated: "Virtual Cell Solution for Mobility and Regulatory Support for Satellite Access in 5G", 3GPP Draft, SA WG2 Meeting #136, S2-1911058, 3rd Generation Partnership Project (3GPP), Mobile Competence Centre, 650, Route Des Lucioles, F-06921, Sophia-Antipolis Cedex, France, vol. SA WG2, No. Reno, Nevada, USA, Nov. 18, 2019-Nov. 22, 2019, Nov. 8, 2019 (Nov. 8, 2019), 9 Pages, XP051821168, Retrieved from the Internet: URL: https://ftp.3gpp.org/tsg_sa/WG2_Arch/TSGS2_136_Reno/Docs/S2-1911858.zipS2-1911058-TR 23.737-Virtual Cell solution.doc [retrieved on Nov. 8, 2019] the whole document, p. 11, paragraph 6.Y.1-p. 4, paragraph 6.Y.1, figures 6.X.1-3, Section 6.Y.1.

\* cited by examiner

SYSTEMS AND TECHNIQUES TO SUPPORT CELL IDENTIFICATION FOR SATELLITE WIRELESS ACCESS

CROSS-REFERENCE TO RELATED APPLICATIONS

This application is a continuation of U.S. Ser. No. 17/670,186, entitled "SYSTEMS AND TECHNIQUES TO SUPPORT CELL IDENTIFICATION FOR SATELLITE WIRELESS ACCESS," filed Feb. 11, 2022, which claims under 35 USC § 119 the benefit of and priority to U.S. Provisional Application No. 63/150,572, filed Feb. 17, 2021, and entitled "SUPPORT FOR FIXED CELL IDENTIFICATION FOR A 5G SATELLITE RAT," both of which are assigned to the assignee hereof and are incorporated herein by reference in their entireties.

BACKGROUND

Field of the Disclosure

Various aspects described herein generally relate to wireless communication systems, and more particularly, to accessing a wireless network using communication satellites.

Description of Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Standardization is ongoing to enable satellite-based communication for wireless networks based on 5G New Radio (NR). In such a system, a user equipment (UE) would access a satellite, also referred to as a space vehicle (SV), instead of a base station, which would connect to an earth station, also referred to as a ground station or non-terrestrial (NTN) gateway, which in turn would connect to a 5G network (e.g. directly or via a base station). A 5G network could treat the satellite access as another type of Radio Access Technology (RAT) distinct from, but also similar to, terrestrial 5G NR.

Since satellites typically differ from terrestrial base stations in terms of the size of their coverage areas, movement of coverage areas, longer propagation delays and different carrier frequencies, a 5G satellite RAT may need different implementation and support than a 5G terrestrial RAT for providing common services to end users. It may then be preferable to both optimize and minimize the impact for such different implementation and support.

SUMMARY

Techniques are described to support call routing and location for a user equipment (UE) with satellite wireless access to a serving PLMN. The UE sends a Session Initiation Protocol (SIP) INVITE message to a network node, such as a P-CSCF, that includes an indication of satellite access for the UE. In response the network node sends a request to another network node for a cell ID for a fixed cell in which the UE is located. The fixed cell can be independent of satellite radio cells for the serving PLMN. The network node may receive the cell ID for the fixed cell and sends the SIP INVITE message to another network node (e.g., an E-CSCF or LRF) with the cell ID for the fixed cell. The other network node may use the cell ID to route the SIP INVITE message or obtain an approximate location of the UE.

In one implementation, a method for supporting satellite wireless access by a user equipment (UE) to a serving public land mobile network (PLMN), performed by a first network node, includes receiving from the UE a Session Initiation Protocol (SIP) INVITE message that includes an indication of satellite access; and sending a request to a second network node for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE.

In one implementation, a first network node configured to support satellite wireless access by a user equipment (UE) to a serving public land mobile network (PLMN), includes an external interface configured to communicate with network entities; at least one memory; at least one processor coupled to the external interface and the at least one memory, wherein the at least one processor is configured to: receive, via the external interface, from the UE a Session Initiation Protocol (SIP) INVITE message that includes an indication of satellite access; and send, via the external interface, a request to a second network node for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE.

In one implementation, a first network node configured to support satellite wireless access by a user equipment (UE) to a serving public land mobile network (PLMN), includes means for receiving from the UE a Session Initiation Protocol (SIP) INVITE message that includes an indication of satellite access; and means for sending a request to a second network node for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE.

In one implementation, a non-transitory storage medium includes program code stored thereon, where the program code is operable to configure at least one processor in a first network node to support satellite wireless access by a user equipment (UE) to a serving public land mobile network (PLMN), the program code comprising instructions to: receive from the UE a Session Initiation Protocol (SIP)

INVITE message that includes an indication of satellite access; and send a request to a second network node for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE.

In one implementation, a method for supporting satellite wireless access by a user equipment (UE) to a serving public land mobile network (PLMN), performed by the UE, includes sending a Session Initiation Protocol (SIP) INVITE message to a network node that includes an indication of satellite access; and wherein the network node requests and obtains a cell ID for a fixed cell in which the UE is located in response to the indication of satellite access, wherein the fixed cell is independent of satellite radio cells for the serving PLMN and wherein the cell ID for the fixed cell is used to assist routing of the SIP INVITE message or obtain an approximate location of the UE.

In one implementation, a user equipment (UE) configured to support satellite wireless access by the UE to a serving public land mobile network (PLMN), includes a wireless transceiver configured to wirelessly communicate with a communication satellite; at least one memory; at least one processor coupled to the wireless transceiver and the at least one memory, wherein the at least one processor is configured to: send, via the wireless transceiver, a Session Initiation Protocol (SIP) INVITE message to a network node that includes an indication of satellite access; and wherein the network node requests and obtains a cell ID for a fixed cell in which the UE is located in response to the indication of satellite access, wherein the fixed cell is independent of satellite radio cells for the serving PLMN and wherein the cell ID for the fixed cell is used to assist routing of the SIP INVITE message or obtain an approximate location of the UE.

In one implementation, a user equipment (UE) configured to support satellite wireless access by the UE to a serving public land mobile network (PLMN), includes means for sending a Session Initiation Protocol (SIP) INVITE message to a network node that includes an indication of satellite access; and wherein the network node requests and obtains a cell ID for a fixed cell in which the UE is located in response to the indication of satellite access, wherein the fixed cell is independent of satellite radio cells for the serving PLMN and wherein the cell ID for the fixed cell is used to assist routing of the SIP INVITE message or obtain an approximate location of the UE.

In one implementation, a non-transitory storage medium includes program code stored thereon, where the program code is operable to configure at least one processor in a user equipment (UE) to support satellite wireless access by the UE to a serving public land mobile network (PLMN), the program code comprising instructions to: send a Session Initiation Protocol (SIP) INVITE message to a network node that includes an indication of satellite access; and wherein the network node requests and obtains a cell ID for a fixed cell in which the UE is located in response to the indication of satellite access, wherein the fixed cell is independent of satellite radio cells for the serving PLMN and wherein the cell ID for the fixed cell is used to assist routing of the SIP INVITE message or obtain an approximate location of the UE.

Figure 1:
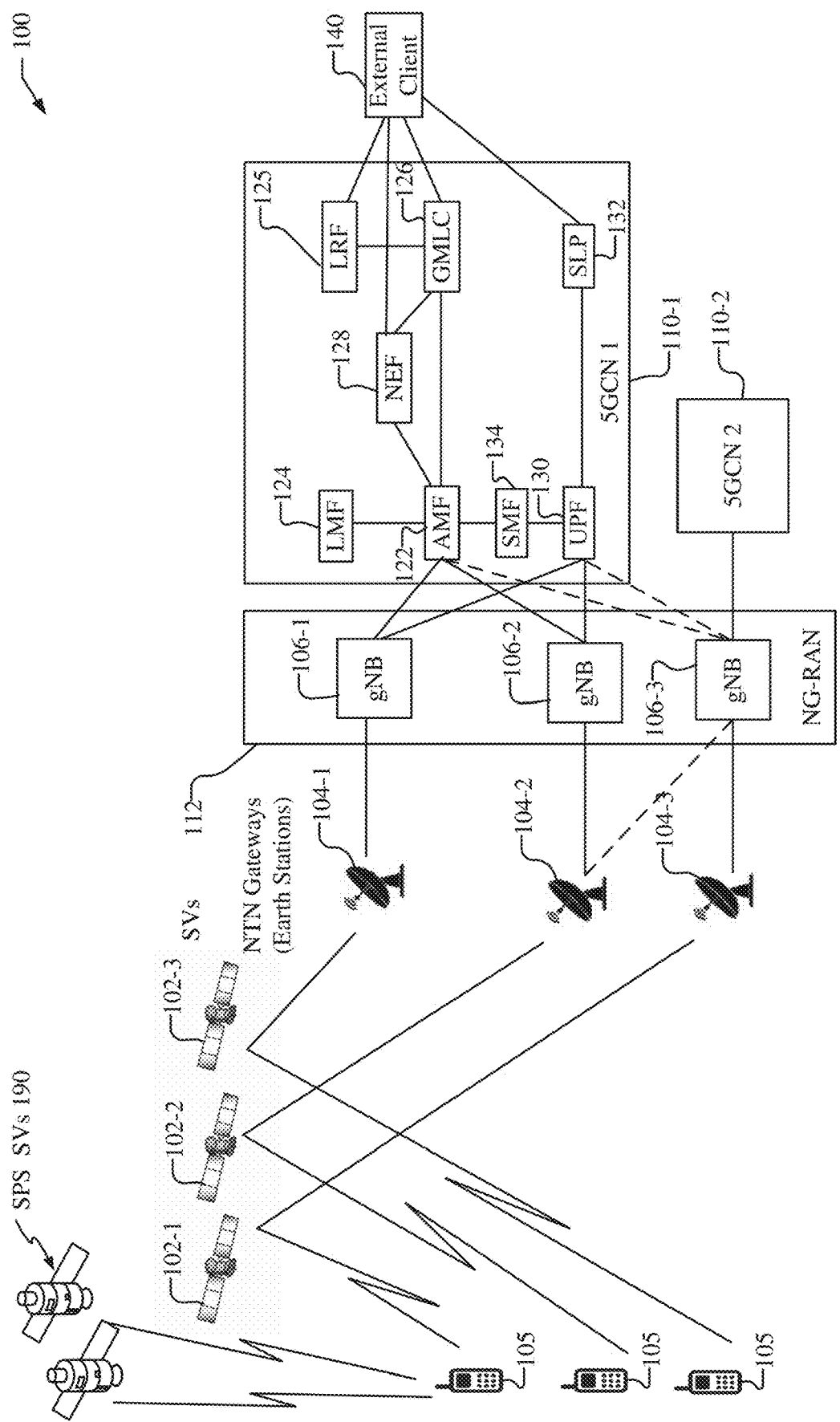
FIG. 1 shows a diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Satellites, also referred to as space vehicles (SVs) or communication satellites, may be used in communication systems, for example, using gateways and one or more satellites to relay communication signals between the gateways and one or more UEs. A UE, for example, may access a satellite (instead of a terrestrial base station) which may be connected to an earth station (ES), which is also referred to as a ground station or Non-Terrestrial Network (NTN) Gateway. The earth station in turn would connect to an element in a 5G Network such as a modified base station (e.g. without a terrestrial antenna) or a network node in a 5G Core Network (5GCN). This element would in turn provide access to other elements in the 5G Network and ultimately to entities external to the 5G Network such as Internet web servers and other user devices.

A rationale for 5G (or other cellular network) satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g. a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable E911 service, e.g., for a medical emergency or vehicle trouble in remote areas.

The use of 5G satellite access may provide other benefits. For example, 5G satellite access may reduce Mobile Network Operator (MNO) infrastructure cost. For example, an MNO may use satellite access to reduce terrestrial base stations, such as NR NodeBs, also referred to as gNBs, and backhaul deployment in sparsely populated areas. Further, 5G satellite access may be used to overcome internet blockage, e.g., in certain countries. Additionally, 5G satellite access may provide diversification to Space Vehicle Operators (SVOs). For example, 5G NR satellite access could provide another revenue stream to SVOs who would otherwise provide fixed Internet access.

Terrestrial networks (TNs) using terrestrial cellular base stations can support relatively small fixed radio cells (e.g. 100 meters to 10 kms from one side to another) which can have accurately known geographic coverage areas. This allows an operator of a TN to subdivide their overall service area into fixed tracking areas (TAs) which are each composed of a number of fixed radio cells. Tracking areas allow an operator to control access by users (e.g. define certain geographic areas which can only be accessed by a subset of users) and to charge users based on their general location. Radio cells allow an operator a fine level of access control and fine level of charging discrimination and can be used for routing purposes and to support wireless emergency alerting (WEA). For example, a request to set up an emergency call sent by a UE to a TN can include the current serving radio cell of the UE which can be used by the TN to route the emergency call to a Public Safety Answering Point (PSAP), which serves the area of the serving radio cell. In addition, when a WEA message needs to be broadcast in a predefined target area to all UEs currently located in the target area, the TN may direct the WEA message to be broadcast only within radio cells whose coverage areas are within or partly within the target area.

It would be preferable to reuse fixed TAs and fixed radio cells in a Non Terrestrial Network (NTN) in which one or more space vehicles (SV) provide 5G New Radio (NR) access. However, in an NTN, a radio cell may be very large (e.g. 100 to 1000 kms from one side to another) and may be moving, either continuously or in discrete jumps or hops. This would make it difficult to control radio cell coverage (e.g. project a radio cell onto a specific target geographic area with minimal radio leakage outside the geographic area) and to determine the precise coverage area for a radio cell. As a consequence, fixed TAs and fixed radio cells analogous to those used in a TN cannot generally be used in an NTN, which means that the various services supported by fixed TAs and fixed cells in a TN may not be possible, or may be more difficult to support, in an NTN.

Accordingly, as discussed herein, in one implementation, fixed geographic areas, sometimes referred to as fixed cells may be defined in an NTN independently of NTN radio cells such that network elements in the NTN are able to use the fixed cells to derive the various benefits described above for a TN. The definition and support of fixed TAs and fixed cells in an NTN can also avoid impacts for 5G NR standards and implementations. Fixed cells may be referred to as virtual cells, mapped cells or earth fixed cells. Fixed TAs may similarly be referred to as virtual TAs, mapped TAs, earth fixed TAs or simply as TAs. Fixed cells may be identified using a cell identifier (ID), which may be, e.g. a NR Cell Global Identity (NCGI). A cell ID (e.g. an NCGI) corresponding to a fixed geographic area should be available when needed to support routing and location for emergency service calls. This cell ID could be needed by an IP Multimedia Subsystem (IMS) (e.g. Emergency-Call Session Control Function (E-CSCF) and/or Location Retrieval Function (LRF)) and might be obtained from within the 5GCN or might be provided by the UE in a Session Initiation Protocol (SIP) INVITE message (e.g. to an E-CSCF and/or LRF) as currently supported for TN, and as discussed herein.

FIG. 1 illustrates an example network architecture 100 capable of supporting satellite access using 5G New Radio (NR) and using fixed cells, which are defined independently of the network, e.g., for supporting an emergency call from the UE to a local PSAP as discussed herein. For example, fixed cells and fixed TAs may be used by the network to (i) decide whether to allow UE access, (ii) determine charging, (iii) assist location of the UE, (iv) assist in broadcast of alert messages, (v) route emergency calls, etc. FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The network architecture 100 comprises a number of UEs 105, a number of SVs 102-1 to 102-3 (collectively referred to herein as SVs 102), a number of Non-Terrestrial Network (NTN) gateways 104-1 to 104-3 (collectively referred to herein as NTN gateways 104) (sometimes referred to herein simply as gateways 104, earth stations 104, or ground stations 104), a number of NR NodeBs (gNBs) 106-1 to 106-3 (collectively referred to herein as gNBs 106) capable of communication with UEs via SVs 102 and that are part of a Next Generation (NG) Radio Access Network (RAN) (NG-RAN) 112. It is noted that the term gNB refers in general to an enhanced gNB with support for SVs and may be referred to as a gNB (e.g. in 3GPP) or sometimes may be referred to as a satellite NodeB (sNB). The network architecture 100 is illustrated as further including components of a number of Fifth Generation (5G) networks including 5G Core Networks (5GCNs) 110-1 and 110-2 (collectively referred to herein as 5GCNs 110). The 5GCNs 110 may be public land mobile networks (PLMN) that may be located in the same or in different countries. FIG. 1 illustrates various components within 5GCN 1 110-1 that may operate with the NG-RAN 112. It should be understood that 5GCN 2 110-2 and other 5GCNs may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC).

The network architecture 100 may further utilize information from space vehicles (SVs) 190 for Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the network architecture 100 are described below. The network architecture 100 may include additional or alternative components.

Permitted connections in the network architecture 100 having the network architecture with transparent SVs illustrated in FIG. 1, allow a gNB 106 to access multiple Earth stations 104 and/or multiple SVs 102. A gNB 106, e.g., illustrated by gNB 106-3, may also be shared by multiple PLMNs (5GCNs 110), which may all be in the same country or possibly in different countries, and an Earth station 104, e.g., illustrated by Earth station 104-2, may be shared by more than one gNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the network architecture 100. Similarly, the network architecture 100 may include a larger (or smaller) number of SVs 190, SVs 102, earth stations 104, gNBs 106, NG-RAN 112, 5GCNs 110, external clients 140, and/or other components. The illustrated connections that connect the various components in the network architecture 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 140), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of 5GCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite can be determined and precise navigation information including 3-dimensional position, velocity, and time of day of the SPS receiver can then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Observed Time Difference of Arrival (OTDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (Rx-Tx) and/or other positioning methods.

An estimate of a location of the UE 105 may be referred to as a geodetic location, location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The UEs 105 are configured to communicate with 5GCNs 110 via the SVs 102, earth stations 104, and gNBs 106. As illustrated by NG-RAN 112, the NG-RANs associated with the 5GCNs 110 may include one or more gNBs 106. The NG-RAN 112 may further include a number of terrestrial base stations, e.g., gNBs (not shown) that are not capable of communication with UEs via SVs 102 (not shown). Pairs of terrestrial and/or satellite base stations, e.g., gNBs and gNB 106-1 in NG-RAN 112 may be connected to one another using terrestrial links—e.g. directly or indirectly via other gNBs or gNBs 106 and communicate using an Xn interface. Access to the 5G network is provided to UEs 105 via wireless communication between each UE 105 and a serving gNB 106, via an SV 102 and an earth station 104. The gNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB. An ng-eNB may be connected to one or more gNBs 106 and/or gNBs in NG-RAN 112—e.g. directly or indirectly via other gNBs 106, gNBs and/or other ng-eNBs. An ng-eNB may provide LTE wireless access and/or evolved LTE (eLTE) wireless access to a UE 105.

A gNB 106 may be referred to by other names such as a gNB or a "satellite node" or "satellite access node." The gNBs 106 are not the same as terrestrial gNBs, but may be based on a terrestrial gNB with additional capability. For example, a gNB 106 may terminate the radio interface and associated radio interface protocols to UEs 105 and may transmit DL signals to UEs 105 and receive UL signals from UEs 105 via SVs 102 and earth stations (ESs) 104. A gNB 106 may also support signaling connections and voice and data bearers to UEs 105 and may support handover of UEs 105 between different radio cells for the same SV 102, between different SVs 102 and/or between different gNBs 106. In some systems, a gNB 106 may be referred to as a gNB or as an enhanced gNB. GNBs 106 may be configured to manage moving radio beams (for LEO SVs) and associated mobility of UEs 105. The gNBs 106 may assist in the handover (or transfer) of SVs 102 between different Earth stations 104, different gNBs 106, and between different countries. The gNBs 106 may hide or obscure specific aspects of connected SVs 102 from the 5GCN 110, e.g. by interfacing to a 5GCN 110 in the same way or in a similar way to a gNB, and may avoid a 5GCN 110 from having to maintain configuration information for SVs 102 or perform mobility management related to SVs 102. The gNBs 106 may further assist in sharing of SVs 102 over multiple countries. The gNBs 106 may communicate with one or more earth stations 104, e.g., as illustrated by gNB 106-3 communicating with earth stations 104-2 and 104-3. The gNBs 106 may be separate from earth stations 104, e.g., as illustrated by gNBs 106-1 and 106-2, and earth stations 104-1 and 104-2. The gNBs 106 may include or may be combined with one or more earth stations 104, e.g., using a split architecture. For example, with a split architecture, a gNB 106 may include a Central Unit and an earth station may act as Distributed Unit (DU). A gNB 106 may typically be fixed on the ground with transparent SV operation. In one implementation, one gNB 106 may be physically combined with, or physically collocated with, one earth station 104 to reduce complexity and cost.

The earth stations 104 may be shared by more than one gNB 106 and may communicate with UE 105 via the SVs 102. An earth station 104 may be dedicated to just one SVO and to one associated constellation of SV 102 and hence may be owned and managed by the SVO. Earth stations 104 may be included within a gNB 106, e.g., as a gNB-DU within a gNB 106, which may occur when the same SVO or the same MNO owns both the gNB 106 and the included earth stations 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

The gNBs 106 in the NG-RAN 112 may communicate with an Access and Mobility Management Function (AMF) 122 in a 5GCN 110, which, for positioning functionality, may communicate with a Location Management Function (LMF) 124. For example, the gNBs 106 may provide an N2 interface to the AMF 122. An N2 interface between a gNB 106 and a 5GCN 110 may be the same as an N2 interface supported between a gNB and a 5GCN 110 for terrestrial NR access by a UE 105 and may use the Next Generation Application Protocol (NGAP) defined in 3GPP Technical Specification (TS) 38.413 between a gNB 106 and the AMF 122. The AMF 122 may support mobility of the UE 105, including radio cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, OTDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by SVs 102, SVs 190, gNBs and assistance data provided to the UE 105, e.g. by LMF 124).

The GMLC 126 may support a location request for the UE 105 received from an external client 140 and may forward such a location request to the AMF 122 for forwarding by the AMF 122 to the LMF 124. A location response from the LMF 124 (e.g. containing a location estimate for the UE 105) may be similarly returned to the GMLC 126 via the AMF 122, and the GMLC 126 may then return the location response (e.g., containing the location estimate) to the external client 140. The GMLC 126 is shown connected to only the AMF 122 in FIG. 1 though in some implementations may be connected to both the AMF 122 and the LMF 124 and may support direct communication between the GMLC 126 and LMF 124 or indirection communications, e.g. via the AMF 122.

A Network Exposure Function (NEF) 128 may be included in 5GCN 110, e.g., connected to the GMLC 126 and the AMF 122. In some implementations, the NEF 128 may be connected to communicate directly with the external client 140. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet. The UPF 130 may be connected to gNB s 106 and gNBs. UPF 130 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using the SUPL location solution defined by the Open Mobile Alliance (OMA). SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification, and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and in some implementations, the NEF 128. The external client 140 may optionally be connected to the core network 110 and/or to a location server, which may be, e.g., an SLP, that is external to 5GCN 110, via the Internet. The external client 140 may be connected to the UPF 130 directly (not shown in FIG. 1) or through the Internet. The external client 140 may be a server, a web server, or a user device, such as a personal computer, a UE, etc.

A Location Retrieval Function (LRF) 125 may be connected to the GMLC 126, as illustrated, and in some implementations, to the SLP 132, as defined in 3GPP Technical Specifications (TSs) 23.271 and 23.167. LRF 125 may perform the same or similar functions to GMLC 126, with respect to receiving and responding to a location request from an external client 140 that corresponds to a Public Safety Answering Point (PSAP) supporting an emergency call from UE 105. One or more of the GMLC 126, LRF 125, and SLP 132 may be connected to the external client 140, e.g., through another network, such as the Internet.

The AMF 122 may normally support network access and registration by UEs 105, mobility of UEs 105, including radio cell change and handover and may participate in supporting a signaling connection to a UE 105 and possibly data and voice bearers for a UE 105. The role of an AMF 122 may be to transfer an alert message along with a list of identifiers for fixed cells to one or more gNBs 106 (and possibly gNBs) in the NG-RAN 112. Here, and for normal operation, gNBs 106 (and gNBs) may support wireless access using NR by UEs 105. The base stations, comprising the gNBs 106 (and gNBs) broadcast the alert message (e.g. using a SIB12), and including possibly the target area shape, to UEs 105 in their respective coverage areas. The broadcast may occur in each fixed cell that is indicated to a base station in association with the alert message by an AMF 122. A gNB 106 may map the fixed cells to radio cells controlled by the gNB 106 in which the alert message is broadcast (e.g. using a SIB12).

Network architecture 100 may be associated with or have access to space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. UEs 105 may obtain location measurements for signals transmitted by SVs 190 and/or by base stations and access points such as eNBs, ng-eNB, gNB, and/or SVs 102 which may enable a UE 105 to determine a location estimate for UE 105 or to obtain a location estimate for UE 105 from a location server in 5GCN 110, e.g., LMF 124. For example, UE 105 may transfer location measurements to the location server to compute and return the location estimate. UEs 105 (or the LMF 124) may obtain a location estimate for UE 105 using position methods such as GPS, Assisted GPS (A-GPS), Assisted GNSS (A-GNSS), Observed Time Difference of Arrival (OTDOA), Enhanced Cell ID (ECID), multi-cell RTT, Wireless Local Area Network (WLAN) positioning (e.g. using signals transmitted by IEEE 802.11 WiFi access points), sensors (e.g. inertial sensors) in UE 105, or some (hybrid) combination of these. A UE 105 may use a location estimate for the UE 105 for the determination of a cell ID for a fixed cell in which the UE is located.

As noted, while FIG. 1 depicts nodes configured to communicate according to 5G NR and LTE communication protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105 using SVs, a RAN may comprise an E-UTRAN, which may comprise base stations comprising evolved Node Bs (eNBs) supporting LTE wireless access to UEs via NTN Gateways and SVs similar or identical to NTN Gateways 104 and SVs 102 shown in FIG. 1. A core network for such an EPS may comprise an Evolved Packet Core (EPC) comprising elements similar to those in a 5GCN 110, such as a Mobility Management Entity (MME) in place of an AMF 122, an Enhanced Serving Mobile Location Center (E-SMLC) in place of an LMF 124, a Serving Gateway and a Packet Data Network Gateway in place of a UPF 130 and a GMLC, SLP and LRF identical or similar to GMLC 126, SLP 132 and LRF 125 shown in FIG. 1. The EPS may then comprise the E-UTRAN plus EPC, where the E-UTRAN corresponds to NG-RAN 112 and the EPC corresponds to 5GCN 110 in FIG. 1. The methods and techniques described herein for support of cell identification for satellite access may be applicable to such other networks.

In some other embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

Support of transparent SVs 102 with the network architecture shown in FIG. 1 may impact the communication system as follows. The 5GCN 110 may treat a satellite RAT as a new type of terrestrial RAT with longer delay, reduced bandwidth, and higher error rate. Consequently, there may be some impact to Protocol Data Unit (PDU) session establishment and mobility management (MM) and connection management (CM) procedures. The SVs 102 may be shared with other services (e.g. satellite TV, fixed Internet access) with 5G NR mobile access for UEs added in a transparent manner. This may enable legacy SVs 102 to be used and may avoid the need to deploy a new type of SV 102. Further, the gNBs 106 may be fixed and may be configured to support one country and one or more PLMNs in that country. The gNBs 106 may need to assist assignment and transfer of SVs 102 and radio cells between gNBs 106 and earth stations 104 and support handover of UEs 105 between radio cells, SVs 102 and other gNBs 106. Thus, the gNB 106 may differ from a terrestrial gNB. Additionally, a coverage area of a gNB 106 may be much larger than the coverage area of a gNB.

In some implementations, the radio beam coverage of an SV 102 may be large, e.g., up to or greater than 1000 kms across, and may provide access to more than one country. An earth station 104 may be shared by multiple gNBs (e.g., earth station 104-1 may be shared by gNB s 106-1 and 106-2), and a gNB 106 may be shared by multiple core networks in separate PLMNs located in the same country or in different countries (e.g., gNB 106-2 may be shared by 5GCN1 110-1 and 5GCN2 110-1, which may be in different PLMNs in the same country or in different countries).

Other entities in the 5GCN 110 that may be configured with fixed TAs and fixed cells in the 5GCN 110 include the GMLC 126 and LRF 125. Configuration information for a fixed TA or fixed cell in this case may include an identity of the fixed TA or fixed cell and information related to the routing of an emergency call from a UE located in the fixed TA or fixed cell. For example, the routing information may indicate the identity of a PSAP or the identity of some entity connected to a PSAP to which a request to set up an emergency call (e.g. a SIP INVITE message) from a UE 105 located in the fixed TA or fixed cell should be routed.

The configuration of fixed TAs and fixed cells, as described above, may not require a standard definition of a fixed TA or fixed cell. For example, a fixed TA or fixed cell may be defined using a polygon or a regular array of grid points, the exact information used for this (e.g. including a definition of coordinates for grids points or vertices of a polygon and their formatting and encoding) can be defined by the operator or as part of the implementation of an O&M server. Other definitions of a fixed TA or fixed cell could also be used such as a definition based on a map, a civic location, a TN radio cell or TN TA. In addition, there may be no requirement to transfer configuration information for a fixed TA or fixed cell between different network elements of the 5GCN 110.

Figure 2:
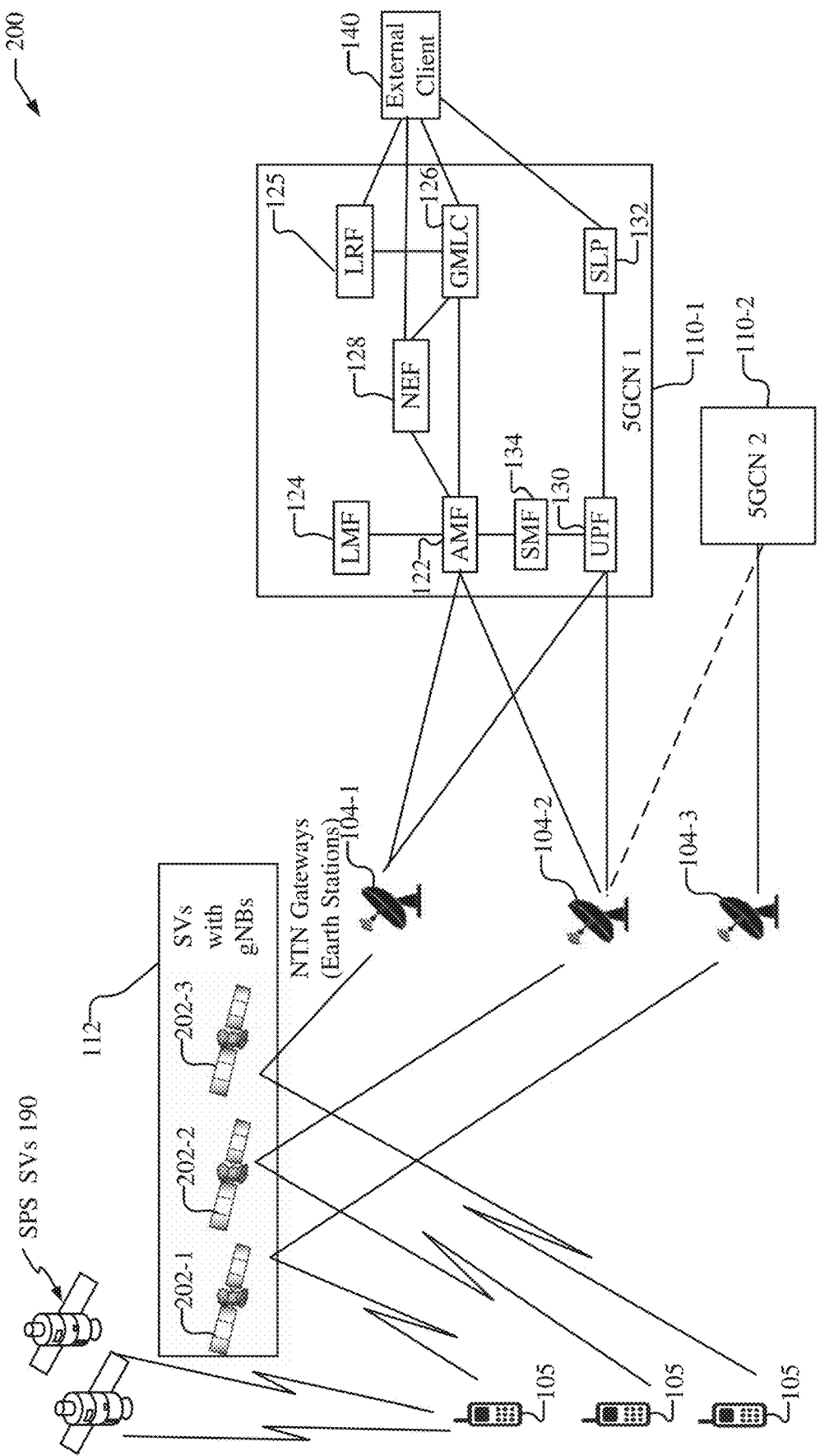
FIG. 2 shows a diagram of a communication system with a network architecture having regenerative SVs that is capable of supporting satellite access to a wireless network.

FIG. 2 shows a diagram of a network architecture 200 capable of supporting satellite access using 5G New Radio (NR) and using fixed cells, which are defined independently of the network, e.g., for supporting an emergency call from the UE to a local PSAP as discussed herein. The network architecture shown in FIG. 2 is similar to that shown in FIG. 1, like designated elements being similar or the same. FIG. 2, however, illustrates a network architecture with regenerative SVs 202-1, 202-2, and 202-3 (collectively SVs 202), as opposed to transparent SVs 102 shown in FIG. 1. A regenerative SV 202, unlike a transparent SV 102, includes an on-board gNB 202 (e.g. includes the functional capability of a gNB), and is sometimes referred to herein as an SV/gNB 202. The NG-RAN 112 is illustrated as including the SV/gNBs 202. Reference to a gNB 202 is used herein when referring to SV/gNB 202 functions related to communication with UEs 105 and 5GCNs 110, whereas reference to an SV 202 is used when referring to SV/gNB 202 functions related to communication with earth stations 104 and with UEs 105 at a physical radio frequency level. However, there may be no precise delimitation of an SV 202 versus a gNB 202.

An onboard gNB 202 may perform many of the same functions as a gNB 106 as described previously. For example, a gNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. A gNB 202 may also support signaling connections and voice and data bearers to UEs 105 and may support handover of UEs 105 between different radio cells for the same gNB 202 and between different gNBs 202. The gNBs 202 may assist in the handover (or transfer) of SVs 202 between different Earth stations 104, different 5GCNs 110, and between different countries. The gNBs 202 may hide or obscure specific aspects of SVs 202 from the 5GCN 110, e.g. by interfacing to a 5GCN 110 in the same way or in a similar way to a gNB. The gNBs 202 may further assist in sharing of SVs 202 over multiple countries. The gNBs 202 may communicate with one or more earth stations 104 and with one or more 5GCNs 110 via the earth stations 104. In some implementations, gNBs 202 may communicate directly with other gNBs 202 using Inter-Satellite Links (ISLs) (not shown in FIG. 2), which may support an Xn interface between any pair of gNBs 202.

With LEO SVs, an SV/gNB 202 needs to manage moving radio cells with coverage in different countries at different times. Earth stations 104 may be connected directly to the 5GCN 110, as illustrated. For example, as illustrated, earth station 104-1 may be connected to AMF 122 and UPF 130 of 5GCN1 110-1, while earth station 104-2 may be similarly connected to 5GCN1 110-1 and 5GNC2 110-2, and earth station 104-3 is connected to 5GCN2 110-2. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2. The 5GCN 110 may need to be aware of SV 202 coverage areas in order to page UEs 105 and to manage handover. Thus, as can be seen, the network architecture with regenerative SVs may have more impact and complexity with respect to both gNBs 202 and 5GCNs 110 than the network architecture with transparent SVs 102 shown in FIG. 1.

Figure 3:
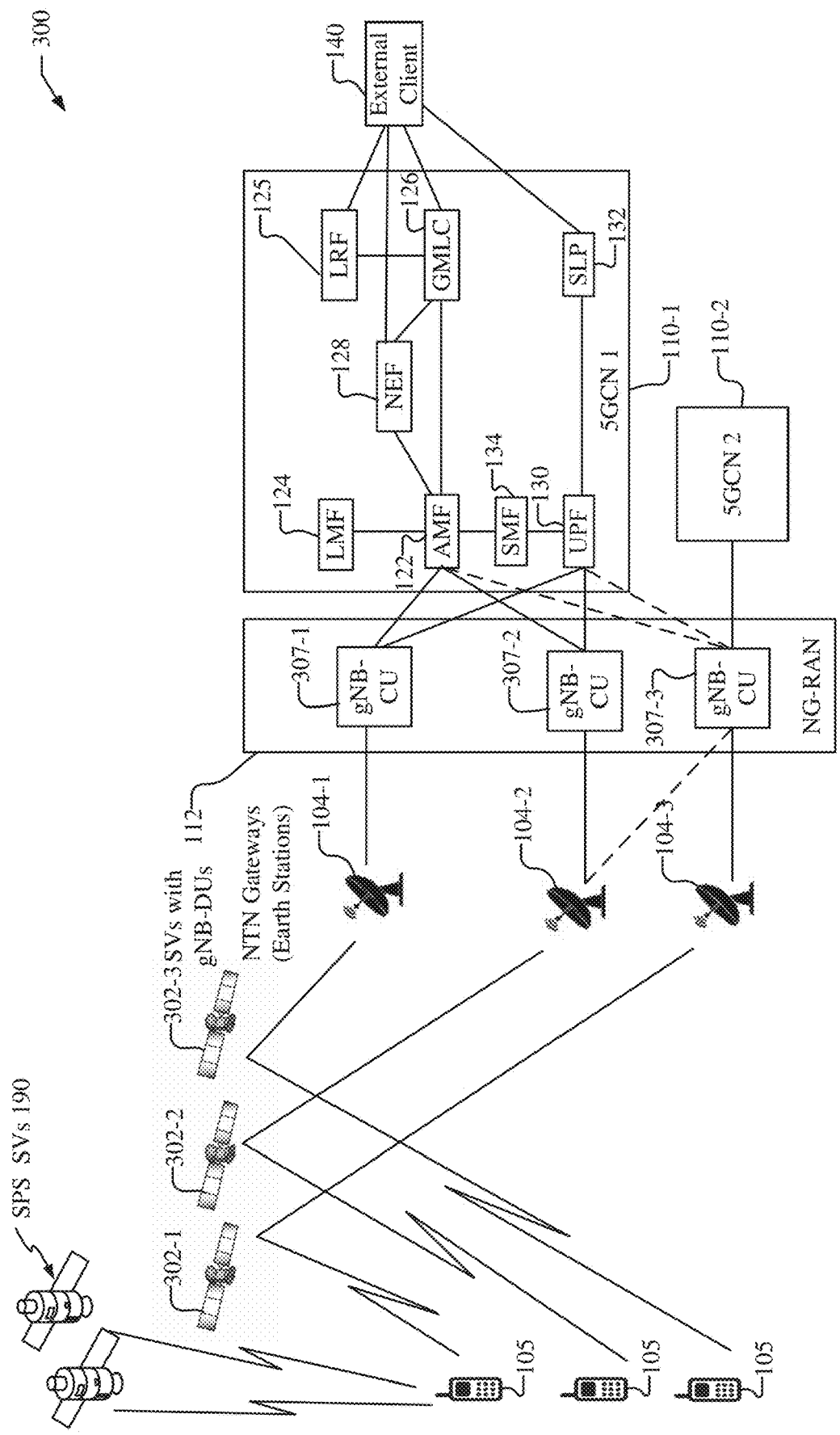
FIG. 3 shows a diagram of a communication system with a network architecture having regenerative SVs and a split satellite Node B (gNB) architecture that is capable of supporting satellite access to a wireless network.

FIG. 3 shows a diagram of a network architecture 300 capable of supporting satellite access using 5G New Radio (NR) and using fixed cells, which are defined independently of the network, e.g., for supporting an emergency call from the UE to a local PSAP as discussed herein. The network architecture shown in FIG. 3 is similar to that shown in FIGS. 1 and 2, like designated elements being similar or the same. FIG. 3, however, illustrates a network architecture with regenerative SVs 302-1, 302-2, and 302-3 (collectively referred to as SVs 302), as opposed to transparent SVs 102 shown in FIG. 1, and with a split architecture for the gNBs. The gNBs 307 include a central unit and may sometimes be referred as gNB-CU 307, and a regenerative SV 302, unlike a transparent SV 102, includes an on-board gNB Distributed Unit (gNB-DU) 302, and is sometimes referred to herein as an SV/gNB-DU 302. Reference to a gNB-DU 302 is used herein when referring to SV/gNB 302 functions related to communication with UEs 105 and gNB-CUs 307, whereas reference to an SV 302 is used when referring to SV/gNB-DU 302 functions related to communication with earth stations 104 and with UEs 105 at a physical radio frequency level. However, there may be no precise delimitation of an SV 302 versus a gNB-DU 302.

Each gNB-DU 302 communicates with one ground based gNB-CU 307 via one or more earth stations 104. One gNB-CU 307 together with the one or more gNB-DUs 302 which are in communication with the gNB-CU 307 performs functions, and may use internal communication protocols, which are similar to or the same as a gNB with a split architecture as described in 3GPP TS 38.401. Here a gNB-DU 302 corresponds to and performs functions similar to or the same as a gNB Distributed Unit (gNB-DU) defined in TS 38.401, while a gNB-CU 307 corresponds to and performs functions similar to or the same as a gNB Central Unit (gNB-CU) defined in TS 38.401. For example, a gNB-DU 302 and a gNB-CU 307 may communicate with one another using an F1 Application Protocol (F1AP) as defined in 3GPP TS 38.473 and together may perform some or all of the same functions as a gNB 106 or gNB 202 as described previously. To simplify references to different types of gNB is the description below, a gNB-DU 302 may sometimes be referred to a gNB 302 (without the "DU" label), and a gNB-CU 307 may sometimes be referred to a gNB 307 (without the "CU" label).

A gNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. A gNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of a gNB-DU 302 is partly controlled by the associated gNB-CU 307. One gNB-DU 307 may support one or more NR radio cells for UEs 105. A gNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. A gNB-CU 307 may also be split into separate control plane (gNB-CU-CP) and user plane (gNB-CU-UP) portions, where a gNB-CU-CP communicates with one or more AMFs 122 in one more 5GCNs 110 using the NGAP protocol and where a gNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. A gNB-DU 302 and gNB-CU 307 may communicate over an F1 interface to (a) support control plane signaling for a UE 105 using Internet Protocol (IP), Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

A gNB-CU 307 may communicate with one or more other gNB-CUs 307 and/or with one more other gNBs using terrestrial links to support an Xn interface between any pair of gNB-CUs 302 and/or between any gNB-CU 307 and any gNB.

A gNB-DU 302 together with a gNB-CU 307 may: (i) support signaling connections and voice and data bearers to UEs 105; (ii) support handover of UEs 105 between different radio cells for the same gNB-DU 302 and between different gNB-DUs 302; and (iii) assist in the handover (or transfer) of SVs 302 between different Earth stations 104, different 5GCNs 110, and between different countries. A gNB-CU 307 may hide or obscure specific aspects of SVs 302 from a 5GCN 110, e.g. by interfacing to a 5GCN 110 in the same way or in a similar way to a gNB. The gNB-CUs 307 may further assist in sharing of SVs 302 over multiple countries.

In network architecture 300, the gNB-DUs 302 that communicate with and are accessible from any gNB-CU 307 will change over time with LEO SVs 302. With the split gNB architecture, a 5GCN 110 may connect to fixed gNB-CUs 307 which do not change over time and which may reduce difficulty with paging of a UE 105. For example, a 5GCN 110 may not need to know which SV/gNB-DUs 302 are needed for paging a UE 105. The network architecture with regenerative SVs 302 with a split gNB architecture may thereby reduce 5GCN 110 impact at the expense of additional impact to a gNB-CU 307.

While supporting satellite access to a wireless network, an SV 102/202/302 may transmit radio beams (also referred to just as "beams") over multiple countries. For example, a beam transmitted by an SV 102/202/302 may overlap two or more countries. Sharing a beam over two or more countries, however, may raise complications. For example, if a beam is shared by two or more countries, earth stations 104 and gNBs 106/202/302/307 in one country may need to support UE 105 access from other countries. Sharing a beam over multiple countries may raise security issues for privacy of both data and voice. Further, sharing an SV beam over multiple countries may raise regulatory conflicts. For example, regulatory services including WEA, LI, and EM calls in a first country may need support from gNBs 106/202/307 and earth stations 104 in a second country that shares the same SV beam.

A first solution to complications raised by beam sharing amongst multiple countries may be to assign one beam to one country. The assignment of a beam to a single country additionally implies assigning each radio cell to one country. This solution may not preclude or prevent beam and radio cell coverage of additional countries, but can restrict UE access to a beam and associated radio cell to just UEs 105 in the country to which the beam and associated radio cell are assigned. A second solution for beam sharing over multiple countries could be to allow a 5GCN 110 in one country to support UEs 105 located in other countries where regulatory approval for this was obtained from the other countries. A third solution could be to share an gNB 106/202/307 among 5GCNs 110 located in different countries (e.g. as could be the case for gNB 106-3, gNB 202-2 and gNB 307-3 shown in FIGS. 1-3), and to verify that each UE 105 accessing the gNB 106/202/307 is registered in and connected to a 5GCN 110 that is in the same country as the UE 105 or permitted to serve the country in which the UE 105 is located.

Figure 4:
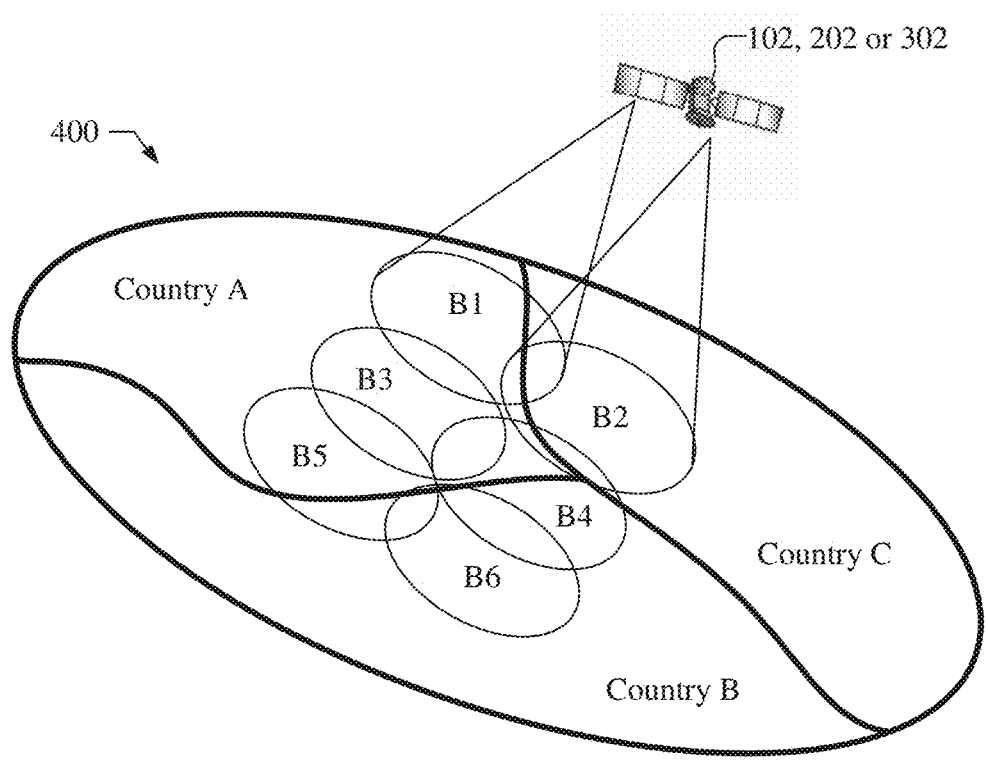
FIG. 4 illustrates an SV generating multiple beams over an area that includes multiple countries.

FIG. 4, by way of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country as for the first solution above, beams B1, B3, B5 may be assigned to country A, beams B4 and B6 may be assigned to country B, and beam B2 may be assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay or mostly stay, within one country, which is sometimes referred to as a "steerable beam". For example, beam coverage may move slowly within one country and then hop to a new country, e.g., after an SV 102, 202, 302 has transferred to a new earth station 104 or new gNB 106 or 307.

Figure 5:
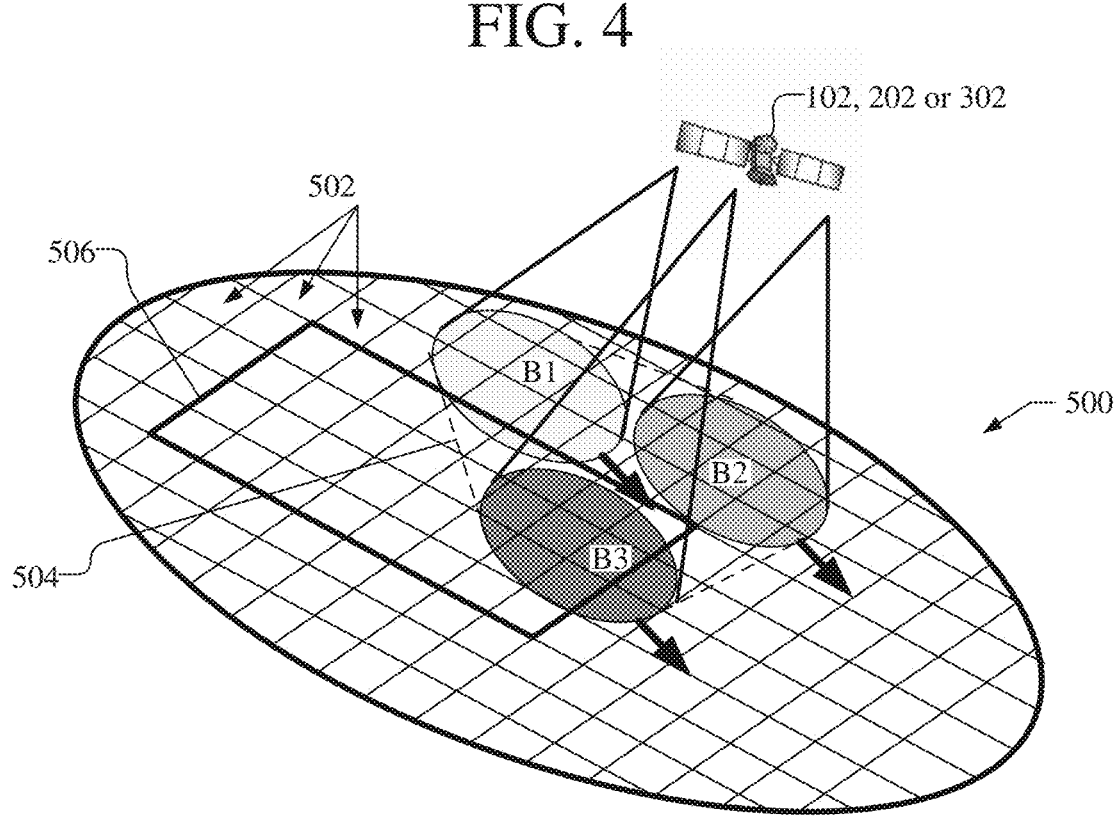
FIG. 5 illustrates radio cells produced by an SV over an area that includes a number of fixed cells.

FIG. 5 illustrates radio cells produced by an SV 102, 202, 302 over an area 500 that includes a number of Earth fixed cells 502. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., radio cell 504 shown with dotted lines). Preferably, a radio cell covers a contiguous area.

Radio beams and radio cells produced by an SV 102, 202, 302 may not align with cells used by terrestrial wireless networks, e.g., 5GCN 110 terrestrial cells or LTE terrestrial cells. For example, in an urban area, a radio beam or radio cell produced by an SV 102, 202. 302 may overlap with many 5GCN terrestrial cells. When supporting satellite access to a wireless network, radio beams and radio cells produced by an SV 102, 202, 302 may be hidden from a 5GCN 110.

As illustrated in FIG. 5, an area 500 may include a number of Earth fixed cells 502, as well as fixed tracking areas (TAs) such as TA 506. Fixed cells are not "real cells," e.g., used for terrestrial NR and LTE access, and may be referred to as "virtual cells", "mapped cells" or "geographic cells." A fixed cell, such as any of fixed cells 502, has a fixed geographic coverage area, which may be defined by a PLMN operator. For example, the coverage area of a fixed cell or a fixed TA may comprise the interior of a circle, ellipse or a polygon. The coverage area is fixed relative to the surface of the Earth and does not change with time, unlike the coverage area of a radio cell which typically changes with time for a LEO or MEO SV. A fixed cell 502 may be treated by a 5GCN 110 the same as a real cell that supports terrestrial NR access. Groups of fixed cells 502 may define a fixed TA 506, which may be treated by a 5GCN the same as TAs that are defined for terrestrial NR access. Fixed cells and fixed TAs used for 5G satellite wireless access may be used by a 5GCN 110 to support mobility management and regulatory services for UEs 105 with minimal new impact.

With regenerative SVs 202 with a non-split architecture as in network architectures 200, each radio cell may remain with the same SV 202 and may have a moving coverage area supporting different 5GCNs 110 at different times.

With transparent SVs 102 and regenerative SVs 302 for a split architecture as in network architecture 300, each radio cell may be assigned to and controlled by one gNB 106 or 307 on behalf of one or more PLMNs in one country. For a GEO SV 102/302, the assignment to a gNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For a non-geostationary (NGEO) SV 102/302, the assignment might last for a short time, e.g., only 5-15 minutes. A non-permanent radio cell may then be transferred to a new gNB 106/307 as necessary (e.g. when access to the NGEO SV 102/302 is transferred to the new gNB 106/307). Each gNB 106/307, for example, may have a fixed geographic coverage area, e.g., comprising a plurality of fixed cells 502 and fixed TAs. A radio cell for a first NGEO SV 102/302 may be transferred from a first gNB 106/307 to a second gNB 106/307 when (or after) moving into the fixed coverage area of the second gNB 106/307. Prior to this transfer, UEs 105 accessing the radio cell in a connected state may be moved to a new radio cell for the first gNB 106/307 or could be handed off to the second gNB 106/307 as part of transferring the radio cell. An SV 102/302 may be accessed from only one gNB 106/307 or from multiple gNBs 106/307, possibly in different countries. In one implementation, an SV 102/302 may be assigned to multiple gNBs 106/307 by partitioning radio cells produced by the SV 102/302 among the different gNBs 106/307. Radio cells may then be transferred to new gNBs 106/307 (and to new countries) as the SV 102/302 moves or as traffic demands change. Such an implementation would be a form of a soft handoff in which SV 102/302 transfer from one gNB 106/307 to another gNB 106/307 occurs in increments of radio cells and not all at once.

Figure 6:
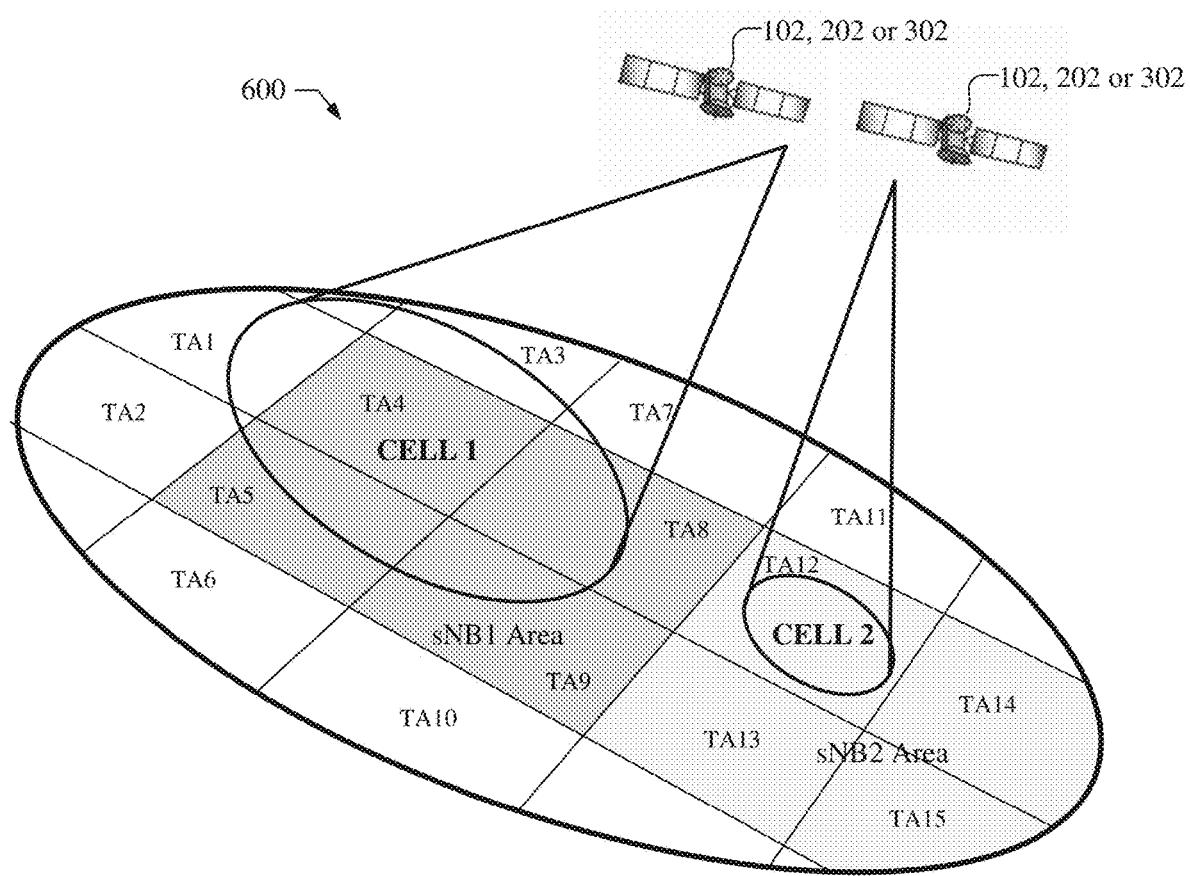
FIG. 6 illustrates an assignment of radio cells produced by an SV to fixed tracking areas (TAs).

FIG. 6 shows an example of assignment of radio cells, e.g., cell 1 and cell 2, produced by one or more SVs 102, 202, 302 over an area 600. As illustrated, the area 600 includes a number of fixed TAs, e.g., TA1-TA15, wherein TA4, TA5, TA8, and TA9 are assigned to a gNB1 (which may be a gNB 106, gNB 202 or a gNB 307), and TA12, TA13, TA14, and TA15 are assigned to a gNB2 (which may be another gNB 106, 202 or 307). In one implementation, a radio cell may be considered to support a fixed TA if the radio cell is wholly within the TA (e.g., Cell 2 within TA 12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g. where the ID of TA comprises a Tracking Area Code (TAC)). For an NGEO SV, the supported PLMNs and TAs may change as radio cell coverage areas change. A gNB 106/202/307 may determine PLMN and TA support (and thus the PLMN IDs and TACs which are broadcast in a SIB for each radio cell) from known ephemeris data for each SV 102/202/302 and a known directionality and angular range for component radio beams for each radio cell (e.g. Cell 1 and Cell 2). A gNB 106/202/307 may then update SIB broadcasting.

Thus, as illustrated in FIG. 6, an SV 102/202/302 may broadcast for cell 1 a SIB that includes TACs for TA4 and possibly TA1, TA3, TA5, TA8 and/or TA9. Similarly, the SV 102/202/302 or another SV 102/202/302 may broadcast for Cell 2 a SIB that includes a TAC for TA12 only. The Cell 1 may be assigned to gNB1 (which has coverage of TA4, TA5, TA8, and TA9) and Cell 2 may be assigned to gNB2 (which has coverage of TA12, TA13, TA14, and TA15. Cell 1 and Cell 2 may be transferred from gNB1 to gNB2 or from gNB2 to gNB1 if the cell coverage area moves from one gNB area to another.

The coverage area for a fixed TA may be defined in a manner that is simple, precise, flexible and requires minimal signaling for possible conveyance to a UE 105, a gNB 106/202/307, or an entity in a 5GCN 110. A fixed TA area may be small enough to allow efficient paging by comprising an area supported by just a few radio cells (e.g. less than or equal to 5) and may also be large enough to avoid excessive UE registration (e.g. may extend at least 100 kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or gNB 106/202/307. A fixed cell coverage area may allow for simple and precise association with a fixed TA, e.g., one fixed cell may belong unambiguously to one TA.

Fixed cells may be used by a wireless core network, such as a 5GCN 110, for support of regulatory services such as emergency (EM) call routing based on a current fixed serving cell for a UE 105, use of a fixed cell to approximate a UE 105 location, use of a fixed cell association to direct a Wireless Emergency Alerting (WEA) alert over a small defined area to a recipient UE 105, or use of a fixed cell as an approximate location or a trigger event for Lawful Interception (LI) for a UE 105. Such usage of fixed cells implies that fixed cells should be capable of being defined with a size and shape similar to that of cells that are defined and used for terrestrial wireless access, including allowing for very small (e.g., pico) cells and large (e.g., rural) cells.

The fixed TAs and fixed cells configured as described above may be used within the network architectures 100, 200, 300 as follows. Within an gNB 106/202/307, a radio cell may be mapped to one or more fixed TAs. For example, the mapping may be to one, some or all fixed TAs which at a particular point in time completely or partly overlap with the coverage area of the radio cell. The gNB 106/202/307 may then broadcast within the radio cell (e.g. in a SIB1), the identities of one or more PLMNs supported by the radio cell and, for each supported PLMN, may broadcast the identities of the fixed TA(s) for this PLMN to which the radio cell maps. A UE 105 that is able to receive the radio cell can then know which TA(s) is/are supported for any PLMN supported by the radio cell. When a UE 105 enters a CONNECTED state with a PLMN and sends a first NAS message (e.g. a NAS Registration Request or NAS Service Request) to the PLMN (e.g. to an AMF 122), the serving gNB 106/202/307 can obtain a location for the UE 105 and map the location to a particular fixed TA and fixed cell for the PLMN. The gNB 106/202/307 can then provide the identities of this fixed TA and fixed cell to the PLMN (e.g. to an AMF 122) along with the first NAS message. The PLMN (e.g. AMF 122) can then use the identities of the fixed TA and fixed cell for various location related purposes similarly to usage in a terrestrial network PLMN. For example, the PLMN may use the identities of this fixed TA and fixed cell to decide whether the UE 105 is allowed to access the PLMN, to determine charging, to assist location of the UE 105 (e.g. as information which can be sent to an external client 140 or to an LMF 124 to assist the LMF 124 to locate the UE 105) and to page the UE 105 at a later time, e.g., where the last fixed TA or last fixed cell used by the UE 105 is provided by the PLMN (e.g. the AMF 122) to an gNB 106/202/302/307 to indicate a location area in which to page the UE 105.

For a terrestrial network (TN), the serving cell ID of a UE can be important to support an emergency call from the UE to a local PSAP. The serving cell ID can be used to support routing of the emergency call to a particular PSAP and/or provision of a location estimate of the UE to the PSAP, as shown in 3GPP Technical Specification (TS) 23.167, 3GPP TS 24.229 and regional emergency services requirements for the US in Alliance for Telecommunications Industry Solutions (ATIS) standard ATIS-0700015. 3GPP and regional specifications provide support for routing of an emergency services call to a PSAP and determination of a location of a UE based on a TN serving cell ID for the UE.

It is noted that usage of a TN serving cell ID as described above is not the only method for routing an emergency services call to a PSAP and providing a location of a UE 105 to a PSAP. For example, a UE 105 can also include a geodetic location in the form a pidf-lo in a SIP INVITE as defined in 3GPP TS 24.229 and in Request for Change (RFC) 4119 and RFC 5491. This geodetic location may then be used for routing to a PSAP and/or as a location estimate for a PSAP (e.g. which may correspond to External Client 140 in FIGS. 1-3). Additionally, the network (e.g. LRF 125) can obtain a location for a UE when an emergency services call is first instigated, as described in TS 23.273 (using a 5GC-NI-LR procedure) and/or when a PSAP requests a location for a UE, as described in TS 23.273 (using a 5GC-MT-LR procedure).

However, networks which currently use a TN serving cell ID to route an emergency services call to a PSAP and/or to determine and provide a location estimate could be least impacted to support emergency services calls for satellite access if an NCGI for a fixed cell with a fixed geographic area can be provided. Although support for routing of an emergency services call to a PSAP and determination of a location of a UE 105 can be based on other information (e.g. a pidf-lo) or other procedures (e.g. LMF location procedures in TS 23.273), continuing support based on a serving cell ID for a UE 105 may reduce network impacts to support emergency services in some networks for UEs 105 with satellite access.

A cell ID for a satellite radio cell (e.g. conveyed in a SIB1) may not correspond to a cell ID for a fixed geographic area as conveyed to the 5GCN 110 by NG-RAN 112 in NGAP user location information. In an NTN, if a UE 105 were to provide the satellite radio cell ID (e.g. as received in SIB1) in a SIP INVITE message, emergency call support based on this (e.g. call routing and location determination) would either not work or would require additional 5GCN impacts to obtain location information for the satellite radio cell— which would remove the benefit of supporting fixed cells corresponding to fixed geographic areas.

Hence, a cell ID (such as a NCGI) corresponding to a fixed cell with a fixed geographic area should be available when needed to support routing and location for emergency service calls. This cell ID would be needed by the IMS (e.g. E-CSCF and/or LRF) and might be obtained from within a 5GCN 110 or might be provided by a UE 105 in a SIP INVITE message (e.g. to an E-CSCF and/or LRF) as currently supported for TN. Six alternative solutions to enable this are described below and are referred to herein as Option A, Option B, Option C, Option D, Option E and Option F.

Option A Solution: The 5GCN 110 or NG-RAN 112 provides geographic definitions and IDs of geographically fixed cells to a UE 105 (e.g. using SIBs by NG-RAN 112 or in a NAS Registration Accept or NAS Service Accept by 5GCN 110). The UE 105 then obtains its location and maps the location to a particular fixed cell ID based on the geographic definitions. The UE 105 then includes the determined NCGI in a P-Access-Network-Info header field in a SIP INVITE message.

Option B Solution: The 5GCN AMF 122 or SMF 134 provides a serving NCGI to a UE 105 using a Non Access Stratum (NAS) message when an emergency call is being established. This can be the NCGI received from NG-RAN 112 in NGAP user location information. The NCGI can be provided by the AMF 122 in a NAS Registration Accept for a registration for emergency services and/or by the SMF 134 in a NAS Protocol Data Unit (PDU) Session Establishment Accept for a PDU session establishment for emergency services (assuming the AMF 122 also provides the NCGI to the SMF 134 when requesting the PDU session establishment). If the UE 105 needs to reattempt an emergency services call using an existing PDU session for emergency services sometime after this PDU session was first established, the UE 105 could instigate a new registration in order to receive the most current NCGI from the AMF 122.

Option C Solution: NG-RAN 112 (e.g. a gNB 106/202/307) provides an NCGI to a UE 105 in an Radio Resource Control (RRC) downlink (DL) Information Transfer message when the UE 105 has a PDU session for emergency services. The NG-RAN 112 can identify a PDU session for emergency services using the NGAP Allocation and Retention Priority Information Element (IE) provided as part of NGAP Quality of Service (QoS) Flow Level QoS Parameters by an AMF 122 when requesting a PDU Session Resource Setup from NG-RAN 112, as described in 3GPP TS 38.413. In one variant, the NG-RAN 112 (e.g. a gNB 106/202/307) can provide an NCGI to a UE 105 in an RRC DL Information Transfer message when an indication of an emergency call for the UE 105 is received from a serving AMF 122 in an NGAP Downlink NAS Transport message. In another variant, the NG-RAN 112 (e.g. a gNB) could provide an NCGI to a UE 105 in an RRC Setup message as part of RRC Connection establishment by the UE 105 if the NG-RAN 112 had previously received an emergency cause indication from the UE 105 in an RRC Setup Request message. The NG-RAN 112 might be configured on a per PLMN basis to support Option C for only certain PLMNs.

Option D Solution: A UE 105 provides an indication of satellite access (e.g. 5G NR satellite access) in a SIP INVITE message sent to the IMS of a serving 5GCN 110, in order to establish an emergency call to a PSAP. The indication of satellite access can be included in a SIP INVITE header that may also include the identity of the serving satellite radio cell for the UE 105. In response to receiving the indication of satellite access in the SIP INVITE message, a first network node in the 5GCN 110 IMS, such as a Proxy-Call Session Control Function (P-CSCF), then requests and obtains the UE 105 serving NCGI for a fixed cell in which UE 105 is located from a second network node, such as a Policy Control Function (PCF), using the Rx interface (as defined in 3GPP TS 29.214 and TS 29.061] or using an Npcf_PolicyAuthorization subscribe and notify (as defined in 3GPP TS 23.502, 23.503). The NCGI is then inserted into the SIP INVITE (e.g. in the P-Access-Network-Info header field) by the first network node, as defined in TS 24.229, from where it can be retrieved by a third network node, such as an Emergency-Call Session Control Function (E-CSCF) or Location Retrieval Function (e.g. LRF 125) which may use the NCGI to assist routing of the SIP INVITE to a PSAP and/or to determine and provide a location of the UE 105 to the PSAP. For a UE 105 with 5G satellite access, the PCF can also either (a) subscribe to receive an updated NCGI from the AMF 122 using an Namf_EventExposure_subscribe service operation as defined in 3GPP TS 29.518, or (b) just request the latest NCGI one time only from the AMF 122 whenever a request is received from a P-CSCF for the NCGI to reduce signaling and processing. This could require the AMF 122 to use the existing NGAP Location Reporting Control procedure defined in 3GPP TS 38.413 to request the NG-RAN 112 to either monitor for change of NCGI and report this back to the AMF 122 for case (a) or request the current NCGI one time only for case (b) to ensure that the PCF (and thus the P-CSCF) always has access to the most current NCGI.

Option E Solution: A serving AMF 122 uses the existing 5GC-NI-LR procedure defined in 3GPP TS 23.273 to send an Namf_Location_EventNotify service operation (as defined in 3GPP TS 29.518) to a GMLC 126 carrying the NCGI received from the NG-RAN 112 when the AMF 122 detects an emergency services call instigation by a UE 105 (e.g. when the UE 105 establishes an PDU session for emergency services). The GMLC 126 then conveys the NCGI to the LRF 125.

Option F Solution: A UE 105 requests the current NCGI from the NG-RAN 112 (e.g. a gNB 106/202/307) using RRC. This may require a new RRC procedure or might be added to an existing procedure. The NG-RAN 112 (e.g. gNB 106/202/307) then determines an NCGI for the UE 105 using available UE 105 location information (e.g. a coverage area of a serving radio cell) and returns the NCGI to the UE 105 in an RRC response message.

Option A could require standardization of the geographic definitions for fixed cells and could have significant UE impacts and potentially significant NG-RAN or AMF impacts and could also impact operator O&M to suitably configure fixed cells. However, a UE could always provide the most current fixed NCGI and the NCGI can have high location granularity.

Option B may require addition of a new NCGI parameter in two NAS messages and impacts the AMF and UE. This option can be used to obtain the most current NCGI when the UE is already in CM Connected state (e.g. the UE is reattempting an emergency call on an emergency PDU session established some time ago) by having the UE perform a new registration. Option B also allows for more accurate determination of a serving NCGI by the AMF based on location information obtained by the AMF or LMF when or just after a UE initially registers with the AMF. For example, if the NG-RAN provides an NCGI with low granularity in NGAP user location information, the AMF could optionally determine a new NCGI with higher granularity. (This option could require two or more levels of cell ID definition where some cell IDs correspond to large areas with low granularity and others to small areas with high granularity.)

Option C requires addition of a new NCGI parameter to one RRC message and requires the NG-RAN to determine a current NCGI for a UE for every instance of RRC DL Information Transfer when the UE has a PDU session for emergency services. The NCGI may not always have high granularity if the NG-RAN has insufficiently accurate UE location information.

Option D may add a new impact to the NG-RAN (for NGAP location reporting) unless the NG-RAN can support the NGAP location reporting using capability provided for other NTN services. Option D can also provide the most current NCGI. In addition, Option D could require a P-CSCF to know when a UE was using 5G satellite access in order to subscribe to (for case a) or request (for case b) receipt of the current NCGI from the PCF (or this could always be performed for both TN and NTN access). The P-CSCF, PCF and AMF impacts could be new impacts to the 5GCN if the 5GCN would not otherwise support these impacts for other NTN services. An indication of NTN access could be provided by the UE—e.g. in the P-Access-Network-Info header field. Option D can also, like Option B, provide an NCGI with higher granularity than that available from the NG-RAN if determined by the AMF at or after initial registration.

Option E can use an existing procedure with no new impacts. However, not all networks may support the procedure for other RAT types. For example, the procedure only applies to a network which uses control plane location and would not normally be implemented in a network which use SUPL user plane location. In that case, the procedure could still be added, but would be a new 5GCN impact. The NCGI provided by the solution could also be out of date (and possibly not available) for an emergency services call reattempt by a UE using an already existing PDU session for emergency services.

Option F restricts impacts to the UE and NG-RAN and enables the UE to obtain the most current NCGI. However, NG-RAN impacts may not be small as the NG-RAN would need to obtain recent location information for a UE and map that to an NCGI.

Options B, C and F have a further advantage of enabling a UE 105 to provide an NCGI for a fixed cell to an SLP 132 to support the SUPL location solution. As for control plane location using an LMF as defined in 3GPP TS 23.273 and TS 38.305, a location server such as an LMF 124 or SLP 132, can benefit from an initial approximate location of a UE 105 in the form a cell ID which can be used to provide suitable assistance data to the UE 105 for A-GNSS or determine suitable gNBs (nearby to the UE 105) to support NR RAT dependent position methods. An LMF 124 would obtain a cell ID (NCGI) from the serving AMF 122 (which for NTN will already have an NCGI for a fixed cell as discussed here). But a SUPL SLP 132 can only obtain the serving cell ID for a UE 105 from the UE 105 itself in a SUPL message. By providing the fixed cell NCGI to the UE 105, Options B, C and F enable the UE 105 to provide the NCGI to a SUPL SLP 132. This may be useful or even necessary for support of emergency services calls if a network operator uses an SLP 132 to obtain an accurate and reliable location of a UE 105 to provide to a PSAP.

Figure 7:
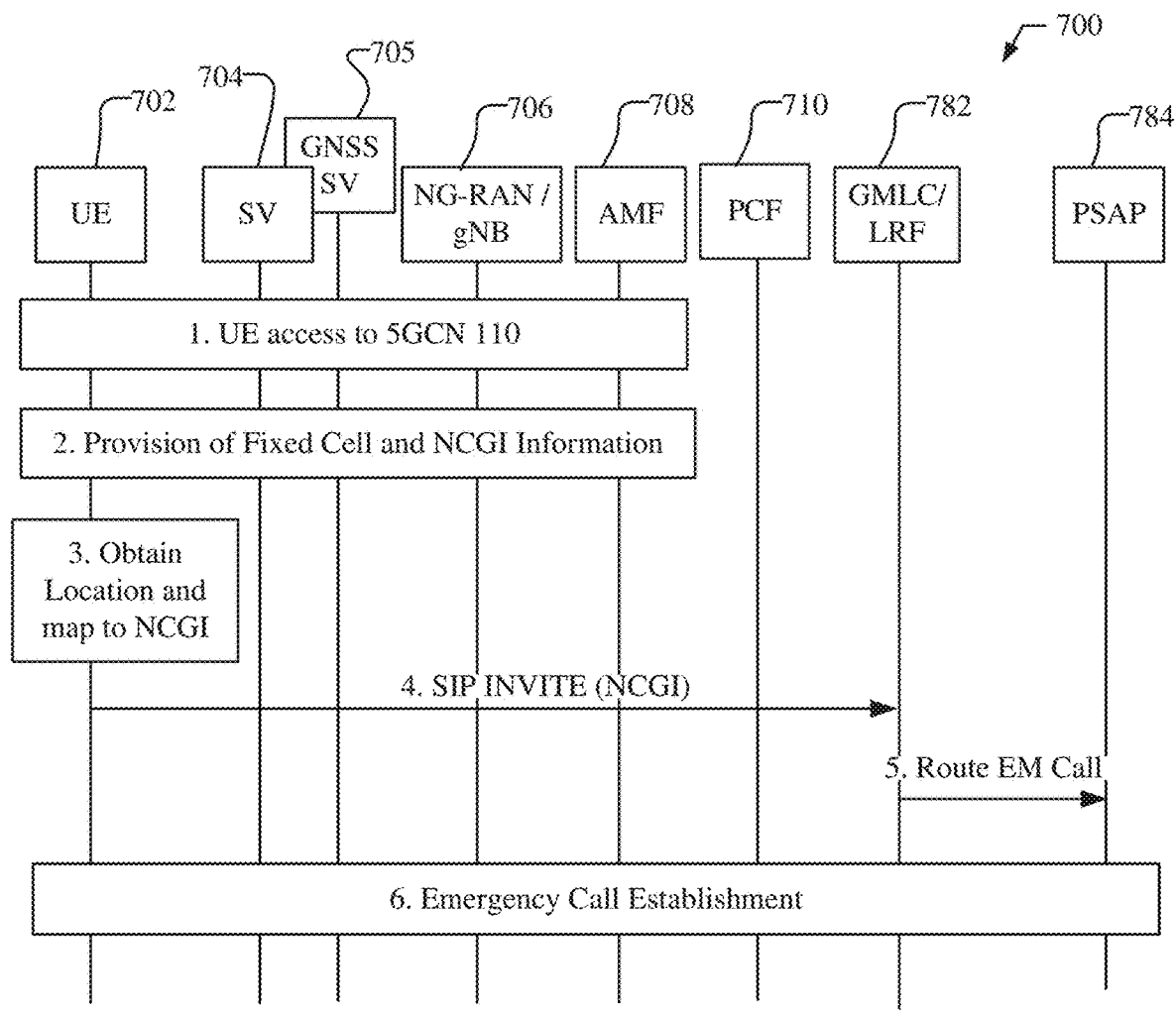
FIG. 7 illustrates a signaling flow with various messages sent between components of a communication system in an emergency call procedure.

FIG. 7 shows a signaling flow 700 that illustrates various messages sent between components of a communication system in an emergency call procedure that is based on the solution for Option A. The message flow 700 may be performed by entities in the network architectures 100, 200, or 300, in which the UE 702 corresponds to UE 105, SV 704 corresponds to SV 102, 202 or 302, GNSS SV 705 corresponds to SV 190, NG-RAN/gNB 706 corresponds to gNB 106/202/307, the AMF 708 corresponds to AMF 122, PCF 710 is a Policy Control Function in a 5GC 110, and GMLC/LRF 782 corresponds to GMLC 126 and/or LRF 125, and PSAP 784 corresponds to external client 140. It should be understood that the gNB 706 or an element of the gNB 706 may be included within the SV 704. For example, with an SV 202, a gNB 202 would be completely included within the SV 202 as described for FIG. 2. Alternatively, with an SV 302, a gNB 307 (also referred to as a gNB-CU 307) would be terrestrial and physically separate from the SV 302, but the SV 302 would include a gNB-DU 302 as described for FIG. 3.

At stage 1, the UE 702 accesses a serving PLMN 5GCN 110. The access may be for an emergency call, may be an initial access by UE 702, or may be a subsequent access by UE 702.

At stage 2, the NG-RAN/gNB 706 or AMF 708 provide information to UE 702 for fixed cells belonging to the serving PLMN including an indication of the area, boundary and cell ID (NCGI) for each fixed cell. The information minimally includes information for fixed cells at or near to the location of UE 702 and may be included in a SIB broadcast by NG-RAN/gNB 706 or a NAS response message sent by AMF 708.

At stage 3, the UE 702 determines its own location (e.g. using measurements of SVs 704 and/or GNSS SVs 705) and maps the location to one of the fixed cells indicated at stage 2 in which UE 702 is located.

At stage 4, the UE 702 may send via SV 704 and gNB 706 a SIP INVITE message for an emergency call to the serving PLMN (e.g. 5GCN 110) that is forwarded (e.g. by an E-CSCF, not shown in FIG. 7) to the LRF 782. The SIP INVITE message includes the cell ID (NCGI) obtained at stage 2 for the fixed cell determined at stage 3.

At stage 5, the LRF 782 routes, or enables routing of, the emergency call (e.g. the SIP INVITE message) to the PSAP 784 (or to an intermediate entity), based on the cell ID (NCGI) received at stage 4.

At stage 6, the emergency call between the UE 702 and the PSAP 784 is established.

Figure 8:
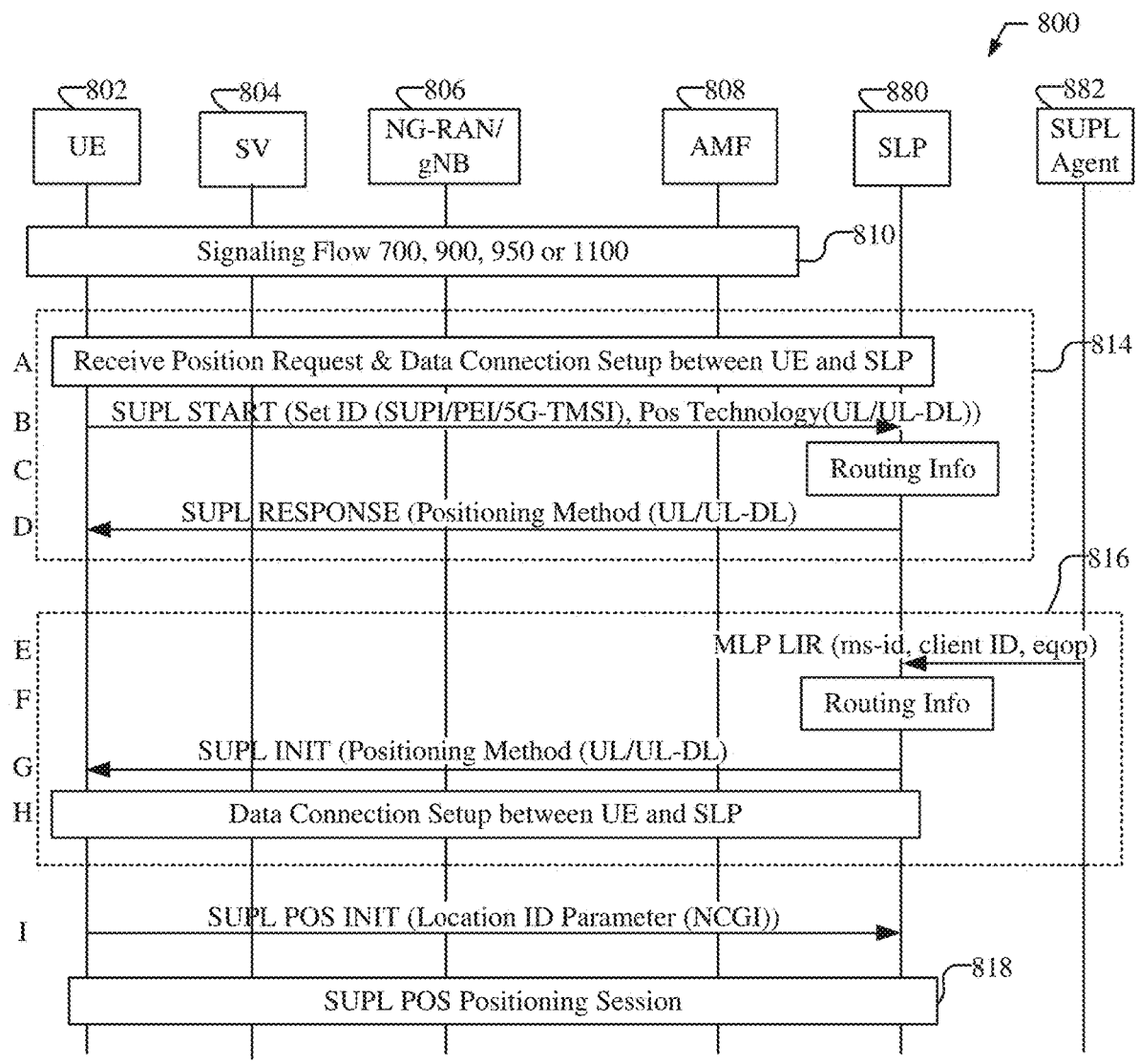
FIG. 8 illustrates a signaling flow for a network initiated or UE initiated SUPL session supporting an emergency call procedure.

FIG. 8 shows a signaling flow 800 illustrating a network initiated or UE initiated SUPL session supporting an emergency call procedure, where the solution in Option A, B, C or F is used to assist the SUPL session. The message flow 800 may be performed by entities in the network architectures 100, 200, or 300 and/or one of signaling flows 700, 900, 950 or 1100, in which the UE 802 corresponds to UE 702/902/1102 and/or UE 105, SV 804 corresponds to SV 102, 202 or 302 and/or SV 704/904/1104, NG-RAN/gNB 806 corresponds to gNB 106/202/307 and/or NG-RAN/gNB 706/906/1106, the AMF 808 corresponds to AMF 122 and/or AMF 708/908, SLP 880 corresponds to SLP 132 and SUPL agent 882 corresponds to a Public Safety Answering Point (PSAP) or LRF 125 in a network initiated SUPL session, while in a UE initiated SUPL session, the SUPL agent resides within the UE 802 and SUPL agent 882 is not used.

It should be understood that the gNB 806 or an element of the gNB 806 may be included within the SV 804. For example, with an SV 202, a gNB 202 would be completely included within the SV 202 as described for FIG. 2. Alternatively, with an SV 302, a gNB 307 (also referred to as a gNB-CU 307) would be terrestrial and physically separate from the SV 302, but the SV 302 would include a gNB-DU 302 as described for FIG. 3. In a UE initiated SUPL session, the SUPL agent resides within the UE 802.

Initially at box 810, part or all of one of the signaling flows 700, 900, 950 or 1100 is performed (as described previously or later herein) to provide UE 802 with the NCGI for the fixed cell in which UE 802 is located.

Box 814 and box 816 illustrate message exchanges used for UE initiation and network initiation of the SUPL session, respectively. Thus, if the message exchanges shown in box 814 for UE initiation of the SUPL session occur, then the message exchanges shown in box 816 for network initiation of the SUPL session are excluded. Similarly, if the message exchanges shown in box 816 for network initiation of the SUPL session occur, then the message exchanges shown in box 814 for UE initiation of the SUPL session are excluded.

The message exchanges and other actions at stages A to D shown in box 814 of FIG. 8 are for a UE initiated SUPL session. Specifically, at stage A, the SUPL agent on the UE 802 receives a request for position from an application running on the UE 802, which may be, a commercial application or an application associated with an emergency call. The UE 802 takes appropriate action to establish or resume a secure connection between the UE 802 and the SLP 880.

At stage B, the UE 802 sends a SUPL START message to start a positioning session with the SLP 880.

At stage C, the SLP 880 may determine routing information for the target UE 802. The SLP 880 also verifies that the target UE 802 is currently not SUPL roaming.

At stage D, consistent with the SUPL START message including posmethod(s) supported by the UE 802, the SLP 880 determines a position method (posmethod). If required for the posmethod, the SLP 880 uses the supported positioning protocol (e.g., RRLP, RRC, TIA-801, LPP or LPP/LPPe) from the SUPL START message. The SLP 880 responds by sending a SUPL RESPONSE message to the UE 802. The SUPL RESPONSE contains the determined posmethod (e.g., an uplink-downlink position method, such as multi-RTT).

The message exchanges and other actions at stages E to H shown in box 816 of FIG. 8 are for a network initiated SUPL session. Specifically, at stage E in FIG. 8, SUPL Agent 882 sends an OMA Mobile Location Protocol (MLP) Location Immediate Request (LIR) message to the SLP 880, with which SUPL Agent is associated. The LIR may be a standard LIR (SLIR) or an emergency LIR (ELIR). The MLP LIR message may include a UE 802 identifier (e.g. a UE 802 IP address, a SUPI, PEI or GPSI) and location data. The SLP 880 may authenticate the SUPL Agent 882 and check if the SUPL Agent 882 is authorized for the service it requests, based on a client-id received. Further, based on the received UE 802 identifier the SLP 880 may apply subscriber privacy against the client-id.

At stage F, the SLP 880 may determine routing information for the target UE 802. The SLP 880 may also verify that the target UE 802 is currently not SUPL roaming and that the target UE 802 supports SUPL.

At stage G, the SLP 880 initiates a location session with the UE 802 by sending a SUPL INIT message to UE 802 (e.g. using IP and UDP). The SUPL INIT message contains at least a session-id, proxy/non-proxy mode indicator and an intended positioning method (posmethod). If the result of the privacy check in Step E indicates that notification or verification to the target subscriber is needed, the SLP 880 may also include a Notification element in the SUPL INIT message. Before the SUPL INIT message is sent, the SLP 880 may compute and store a hash of the message. For an emergency call, the SUPL INIT message may contain an E-SLP address if the SLP 880 is an E-SLP and is not the H-SLP for the UE 802. The SUPL INIT may also contain a desired QoP. The SLP 880 may also include a Notification element in the SUPL INIT message indicating location for emergency services and, according to local regulatory requirements, whether notification or verification to the target UE 802 is or is not required.

At stage H, the UE 802 analyses the received SUPL INIT and takes needed action preparing for establishment or resumption of a secure connection between the UE 802 and the SLP 880. The UE 802 then establishes a secure TCP and TLS connection to the SLP 880 using an SLP address that has been provisioned by the Home Network to the UE 802 (or defaulted to an E-SLP address or an E-SLP address received in step G).

At stage I, the UE 802 sends a SUPL POS INIT message to start a positioning session with the SLP 880 using LPP or LPP/LPPe messages. The UE 802 sends the SUPL POS INIT message even if the UE 802 supported positioning technologies do not include the intended positioning method indicated in the SUPL INIT message from stage G or the SUPL RESPONSE message from stage D. The SUPL POS INIT message contains a Location ID parameter that includes a cell ID for the fixed cell in which the UE 802 is located, such as the NCGI obtained by UE 802 at box 810.

At box 818, the UE 802 and SLP 880 exchange SUPL POS messages, where each SUPL POS message may include an LTE Positioning Protocol (LPP) message or an LPP message containing an LPP Extensions (LPPe) message. LPP is defined by 3GPP and LPPe is defined by OMA and may either or both support the posmethod indicated at stage D or stage G. The NCGI received by the SLP 880 at stage I can be used by the SLP 880 to assist the posmethod such as by enabling the SLP 880 to determine positioning signals, SVs 804 and/or GNSS SVs (not shown in FIG. 8) that UE 802 should receive and measure and may further enable the SLP 880 to provide assistance data to the 802 to enable these measurements and optionally enable UE 802 to determine a location of UE 802 from the measurements. A location of UE 802 obtained by UE 802 or by SLP 880 at box 818 can be provided to SUPL Agent 882 by SLP 880 or may be provided by UE 802 to a PSAP in the case of an emergency call by UE 802 to the PSAP.

Figure 9A:
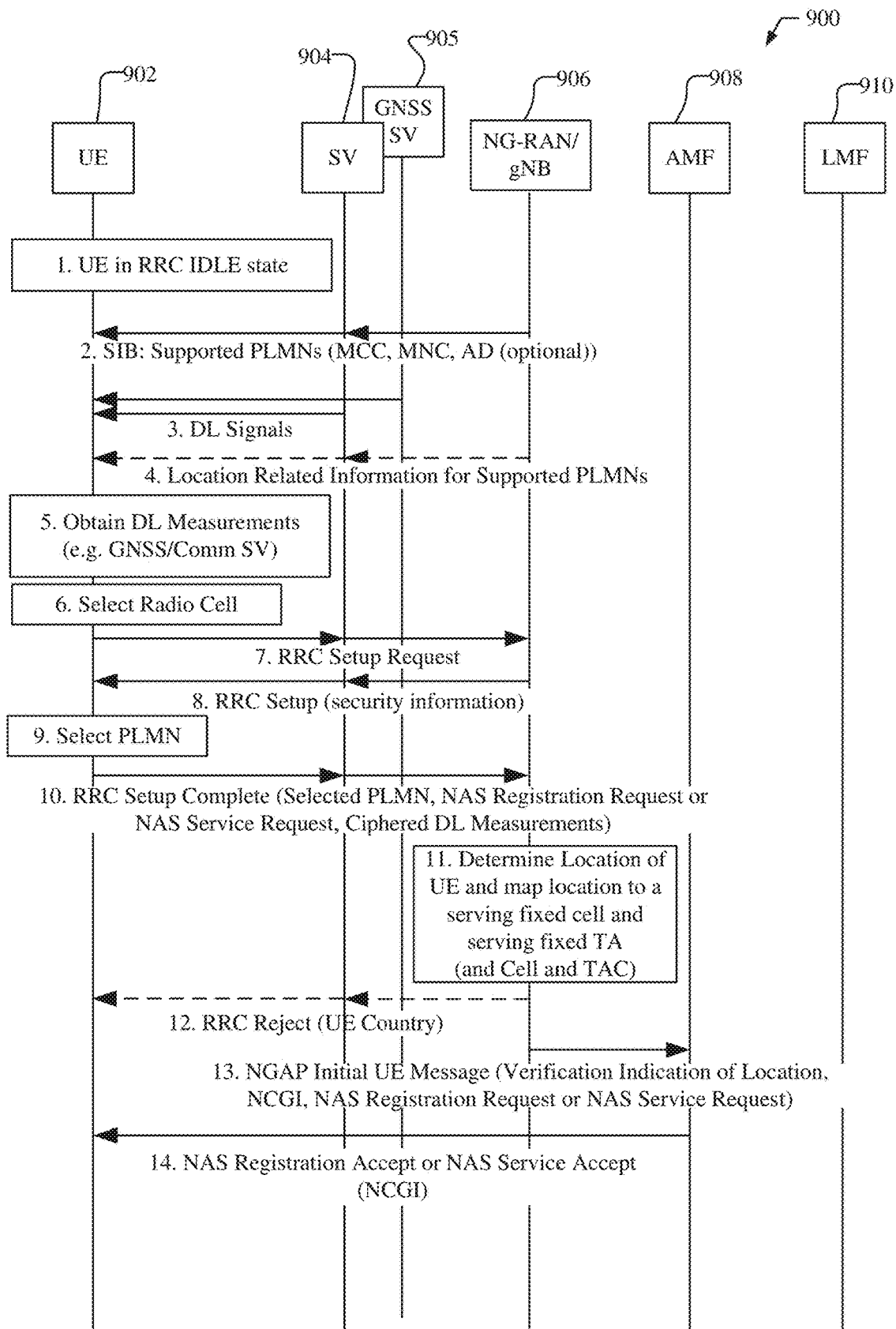
FIGS. 9A and 9B illustrate signaling flows with various messages sent between components of a communication system in a procedure for initial PLMN access by a UE.

FIG. 9A shows a signaling flow 900 that supports the solution in Option B. The signaling flow 900 may be performed by entities in the network architectures 100, 200, or 300, in which the UE 902 corresponds to UE 105, SV 904 corresponds to SV 102, 202 or 302, GNSS SV 905 corresponds to SV 190, gNB 906 corresponds to gNB 106/202/307, AMF 908 corresponds to AMF 122, and LMF 910 corresponds to LMF 124. It should be understood that the gNB 906 or an element of the gNB 906 may be included within the SV 904. For example, with an SV 202, a gNB 202 would be completely included within the SV 202 as described for FIG. 2. Alternatively, with an SV 302, a gNB 307 (also referred to as a gNB-CU 307) would be terrestrial and physically separate from the SV 302, but the SV 302 would include a gNB-DU 302 as described for FIG. 3.

At stage 1 in FIG. 9A, the UE 902 is in a 5G Mobility Management (5GMM) DEREGISTERED state and RRC IDLE state.

At stage 2, the gNB 906 broadcasts (via an SV 904) indications of supported PLMNs (e.g. an MCC-MNC for each PLMN) in each radio cell. The UE 902 may detect radio cells from one or more radio beams transmitted by one or more SVs, including the SV 904. The gNB 906 may control SV 904 to broadcast system information blocks (SIBs) in one or more radio cells of the gNB 906. The SIBs may indicate one or more PLMNs (referred to as supported PLMNs) supported by the gNB 906 in each radio cell for the gNB 906. The PLMNs may each be identified in a SIB by a mobile country code (MCC) and a mobile network code (MNC), where the MCC indicates a country for each identified PLMN (i.e. a country to which each identified PLMN belongs). The gNB 906 may optionally broadcast assistance data in each radio cell (e.g. may broadcast assistance data in a SIB or posSIB), such as assistance data previously received or generated by the gNB 906. The SIBs may include security information described below for stage 8 such as ciphering key(s) and an indication of ciphering algorithm(s).

At stage 3, the UE 902 receives DL signals (e.g. DL PRS signals) from a plurality of satellites, which may include one or more of the communication SVs 904 and/or DL signals from GNSS SVs 905.

At stage 4, which is optional, the UE 902 may receive location related information for the supported PLMNs broadcast (e.g. in one or more SIBs) in the one or more radio cells from the gNB 906 via the SV 904. For example, the location related information for the supported PLMNs may comprise geographic definitions for fixed cells of each supported PLMN, geographic definitions for fixed tracking areas of each supported PLMN, or both.

At stage 5, the UE 902 may obtain DL measurements from the DL signals received from the plurality of satellites at stage 3. The DL measurements, for example, may be GNSS measurements from one or more GNSS SVs 905 and/or measurements of characteristics of the DL signals from one or more communication SVs 904, such as a Reference Signal Received Power (RSRP), Reference Signal Received Quality (RSRQ), Rx-Tx, RTT, AOA. The UE 902 may further measure a Differential AOA (DAOA) or a Reference Signal Time Difference (RSTD) for DL signals received from one or more pairs of SVs 904. In some embodiments, the UE 902 may further determine a location of the UE 902 (referred to herein as a UE 902 location) based on the DL measurements and possibly based in addition on any assistance data received at stage 2.

At stage 6, UE 902 selects a radio cell. In one implementation, the UE 902 may first select a PLMN (referred to as a selected PLMN), where the selected PLMN is a preferred PLMN in the supported PLMNs indicated at stage 2 in the one or more radio cells of the gNB 906. The UE 902 may then select the radio cell at stage 6 based on the radio cell indicating support for the preferred PLMN.

At stage 7, UE 902 may send an RRC Setup Request message to the gNB 906 that supports the selected radio cell via the SV 904 using the selected radio cell (e.g. after having performed a random access procedure to obtain initial access to the selected radio cell from the gNB 906).

At stage 8, the gNB 906 may return an RRC Setup message to the UE 902. The gNB 906 may include security information in the RRC Setup message (e.g. if not provided at stage 2) that includes a ciphering key and an indication of a ciphering algorithm.

At stage 9, the UE 902 may select a supported PLMN (referred to below as the selected PLMN) if not previously selected at stage 6. The selected PLMN may be one of the supported PLMNs indicated at stage 2 for the radio cell selected at stage 6. The selected PLMN (as selected at stage 6 or stage 9) is also referred to as a serving PLMN below since the selected PLMN acts as a serving PLMN for UE 902 following stage 14.

At stage 10, UE 902 sends an RRC Setup Complete message to the gNB 906 and includes an indication (e.g. MCC and MNC) of the selected PLMN and a Non-Access Stratum (NAS) Registration Request or NAS Service Request message. The UE 902 may also include any DL location measurements or any UE 902 location obtained at stage 6 if stage 6 was performed. The DL location measurements or the UE 902 location may be included in a confidential (or concealed) form by ciphering the DL location measurements or the UE 902 location using a ciphering key and ciphering algorithm indicated at stage 2 or 8. The determination and encoding of the confidential location measurements or the UE 902 location may reuse some of the functionality used to support a Subscription Concealed Identifier (SUCI) as described in 3GPP Technical Specification (TS) 23.003.

At stage 11, the gNB 906, or an embedded or attached Location Management Component (LMC), may determine a location and country for UE 902 using any DL location measurements or UE 902 location received at stage 10 and any assistance data and maps the location to a fixed serving TA and fixed serving cell based on the configuration information for fixed TAs and fixed cells to generate a fixed cell ID (e.g., NGCI). The gNB 906 (or LMC), for example, may decipher the DL location measurements or the UE 902 location sent at stage 10 based on the ciphering key and the ciphering algorithm indicated at stage 2 or stage 8. For example, the gNB 906 (or LMC) may use a private ciphering key that corresponds to a public ciphering key sent at stage 2 or stage 8, to decipher the ciphered DL location measurements or ciphered UE 902 location based on a public key-private key ciphering algorithm (e.g. the RCA algorithm) indicated at stage 2 or stage 8.

The gNB 906 may use any DL location measurements that the UE 902 sent at stage 10, which may include GNSS measurements and/or characteristics of received signals, e.g., RSRP, RSRQ, Rx-Tx, AOA, RTT, RSTD, or DAOA, measured by the UE 902 at stage 6 and the assistance data received at stage 2, to determine the location of the UE 902, e.g., using A-GNSS, ECID, RTT, TDOA, AOA, or other positioning techniques. The country in which the UE 902 is located may then be determined based on the determined location of the UE 902. The gNB 906 (or LMC) may determine the location and country of the UE 902 using other techniques. In some implementations, measured characteristics of the serving radio cell, e.g. RSRP, RSRQ, Rx-Tx, AOA or some combination thereof, measured by the UE 902 at stage 6, may be used to refine the location of the UE 902. In some implementations, the location determination and location mapping to a country may be performed by a Location Management Component (LMC) which may be part of, attached to, or reachable from gNB 906. In some implementations, gNB 906 and/or SV 904 may obtain uplink (UL) measurements of signals transmitted by UE 902, e.g. UL measurements of RSRP, RSRQ, Rx-Tx and/or AOA which may be used to determine or help determine the location of UE 902 at stage 11. In some implementations, gNB 906 may use knowledge of a coverage area for the radio cell selected at stage 6 or a coverage area of a radio beam for the radio cell selected at stage 6 to determine or help determine the location of UE 902 at stage 11. The gNB 906 may map the location to a country and verify the country is supported by the gNB 906 and matches the country of the selected PLMN indicated at stage 10. In some implementations, the gNB 906 may further determine a fixed serving cell and/or a fixed serving Tracking Area (TA) for UE 902, e.g., by mapping a UE 902 location to a Cell ID (e.g., NGCI) and/or TA Code (TAC), for the selected PLMN indicated at stage 9.

At stage 12, if the UE country determined at step 11 is not supported by the gNB 906 or does not match the country for the selected PLMN, the gNB 906 may return an RRC Reject message to UE 902. The RRC Reject message may indicate the country (e.g. using an MCC) that the UE 902 is located in as determined at stage 11 or may simply indicate that the UE 902 is not located in a country for the selected PLMN. If an RRC Reject message is received, the UE 902 may restart the procedure at stage 6 (e.g. to verify the UE country) or stage 6 (e.g. using the country received at stage 12).

At stage 13, if the UE 902 is in the correct country or may be in the correct country, the gNB 906 sends a Next Generation (NG) Application Protocol (NGAP) message (e.g. an NGAP Initial UE message) to an entity in the selected PLMN, e.g., AMF 908. In some implementations, the NGAP message may include an indication that the gNB 906 has verified the UE 902 location and/or country. The NGAP message may further include an identification of the fixed serving cell and/or fixed serving TA if determined at stage 11 (e.g., the Cell ID (NGCI) and TAC) and/or a location of UE 902 if determined at stage 11. In some implementations, the AMF 908 or LMF 910 may perform the fixed cell and/or fixed TA (Cell ID and/or TAC) determination, e.g., using configuration information previously received. The NGAP initial UE message may further include, e.g., a NAS Registration Request or a NAS Service Request message sent by UE 902 at stage 10. If the NGAP message indicates that the UE 902 location and country are fully verified by the gNB 906, the AMF 908 may accept the NAS Registration Request or Service Request. Otherwise, the AMF 908 may determine and verify the UE 902 country—e.g. using a location of UE 902 received at stage 13 or by obtaining a location of UE 902 using LMF 910 (not shown in FIG. 9A).

At stage 14, the AMF 908 returns a NAS Registration Accept or NAS Service Accept message to UE 902 via gNB 906. The NAS Registration Accept or NAS Service Accept message to UE 902 may include an indication of the fixed serving TA and fixed serving cell (e.g. an NCGI), as determined by the gNB 906 in stage 11 or as determined by the AMF 908 or LMF 910 in stage 13. The AMF 908 may include allowed fixed TAs (TACs) for UE 902 (in which UE 902 is allowed to roam) and location information such as geographic definitions of the allowed fixed TAs and constituent fixed cells for the allowed fixed TAs. The UE 902 may retain the NCGI received at stage 14 and include the NCGI in a SIP INVITE sent later to the serving PLMN for an emergency call.

Figure 9B:
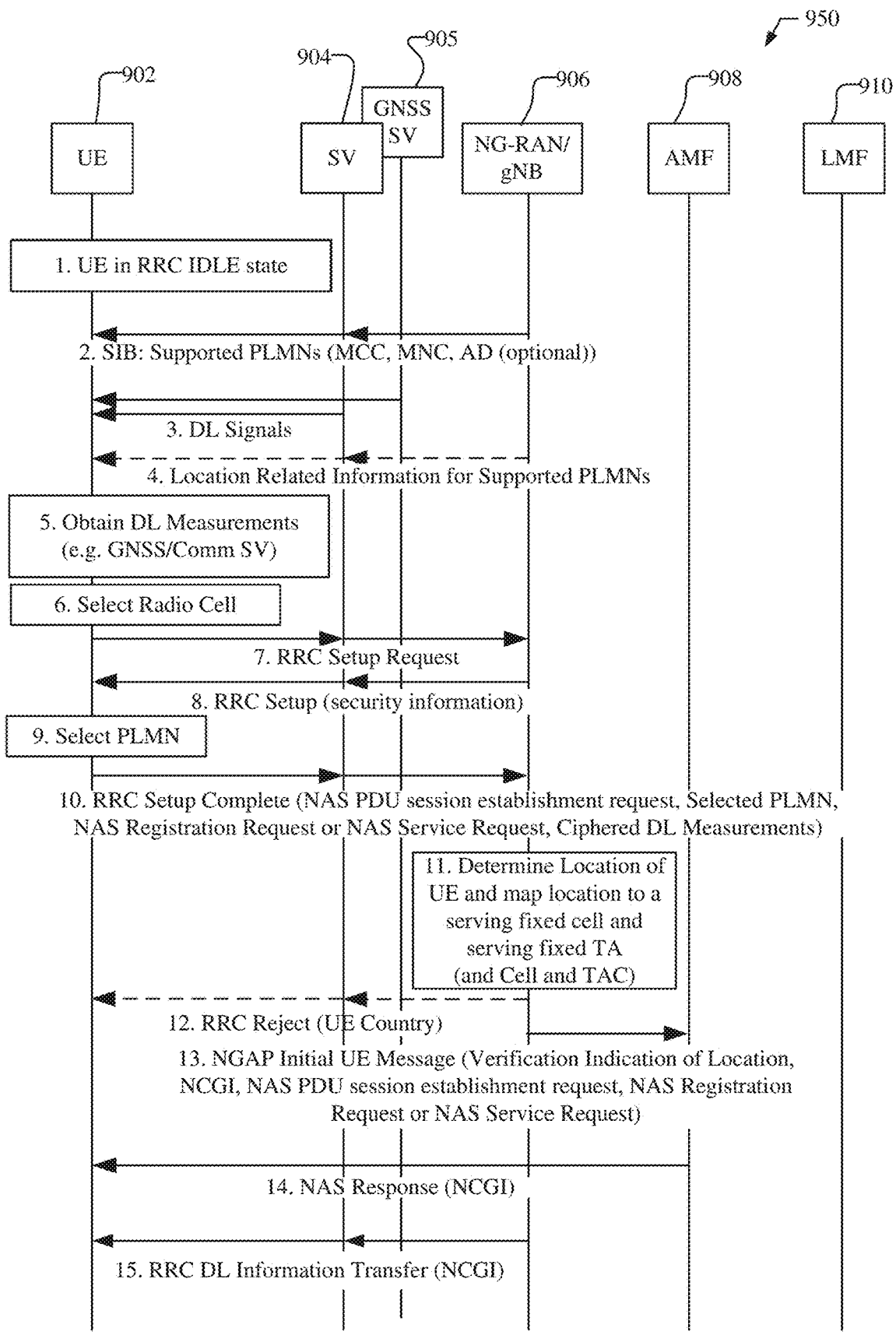

FIG. 9B shows a signaling flow 950 that illustrates examples of the solutions for Option B and Option C. FIG. 9B is similar to FIG. 9A, except that the NCGI may be provided in either an RRC message for Option C or a NAS response message for Option B.

Stages 1 to 9 of FIG. 9B may occur as described for stages 1 to 9 of FIG. 9A.

At stage 10 of FIG. 9B, the UE 902 may send an RRC Setup Complete message that includes a NAS PDU session establishment request (e.g. for an emergency call), a NAS Registration Request or a NAS Service Request.

Stages 11 and 12 may correspond to stages 11 and 12 of FIG. 9A.

At stage 13, the gNB 906 sends a NGAP Initial UE message to the AMF 808 with the NAS message received at stage 10. The NGAP message may further include an identification of the fixed serving cell and/or fixed serving TA if determined at stage 11 (e.g., the Cell ID (NGCI) and TAC) and/or a location of UE 902 if determined at stage 11.

At stage 14, the AMF 908 sends a NAS response message to UE 902, e.g. establishes a PDU session and sends an NAS PDU Session Establishment Accept for a PDU session establishment. For Option B, the NAS response message may include the fixed cell ID (e.g., NGCI) received at stage 13. If the UE 902 needs to reattempt an emergency services call using an existing PDU session for emergency services sometime after the PDU session was first established, the UE 902 may instigate a new registration in order to receive the most current NCGI from the AMF 908.

For Option C, the gNB 906 can provide the NCGI to the UE 902 in an RRC DL Information Transfer message that may be sent to UE 902 at stage 15 after stage 14. Alternatively, gNB 906 may include the NCGI in an RRC DL Information Transfer message used to transfer the NAS response message to UE 902 at stage 14. In some embodiments, the gNB 906 may include the NCGI in an RRC DL Information Transfer message sent to UE 902 at stage 14 or stage 15 only if the UE 902 is establishing or has established an emergency services call. For example, the NG-RAN/gNB 906 may determine that the UE 902 is establishing or has established an emergency services call if the UE 902 has a PDU session for emergency services, which may be indicated by an NGAP Allocation and Retention Priority IE provided as part of NGAP QoS Flow Level QoS Parameters by AMF 908 to gNB 906 when requesting a PDU Session Resource Setup from gNB 906. In one variant, the gNB 906 can provide an NCGI to the UE 902 in an RRC DL Information Transfer message at stage 14 or stage 15 when an indication of an emergency call for the UE 902 is received from the serving AMF 908 in an NGAP Downlink NAS Transport message. In another variant, the gNB 906 could provide an NCGI to the UE 902 in the RRC Setup message at stage 8 if the gNB 806 had previously received an emergency cause indication from the UE 902 in an RRC Setup Request message at stage 7 (and possibly if the RRC Setup Request at stage 7 message includes a UE 902 location to allow gNB 906 to determine the NCGI). The NG-RAN/gNB 906 may be configured on a per PLMN basis to support the solution in Option C for only certain PLMNs.

Figure 10:
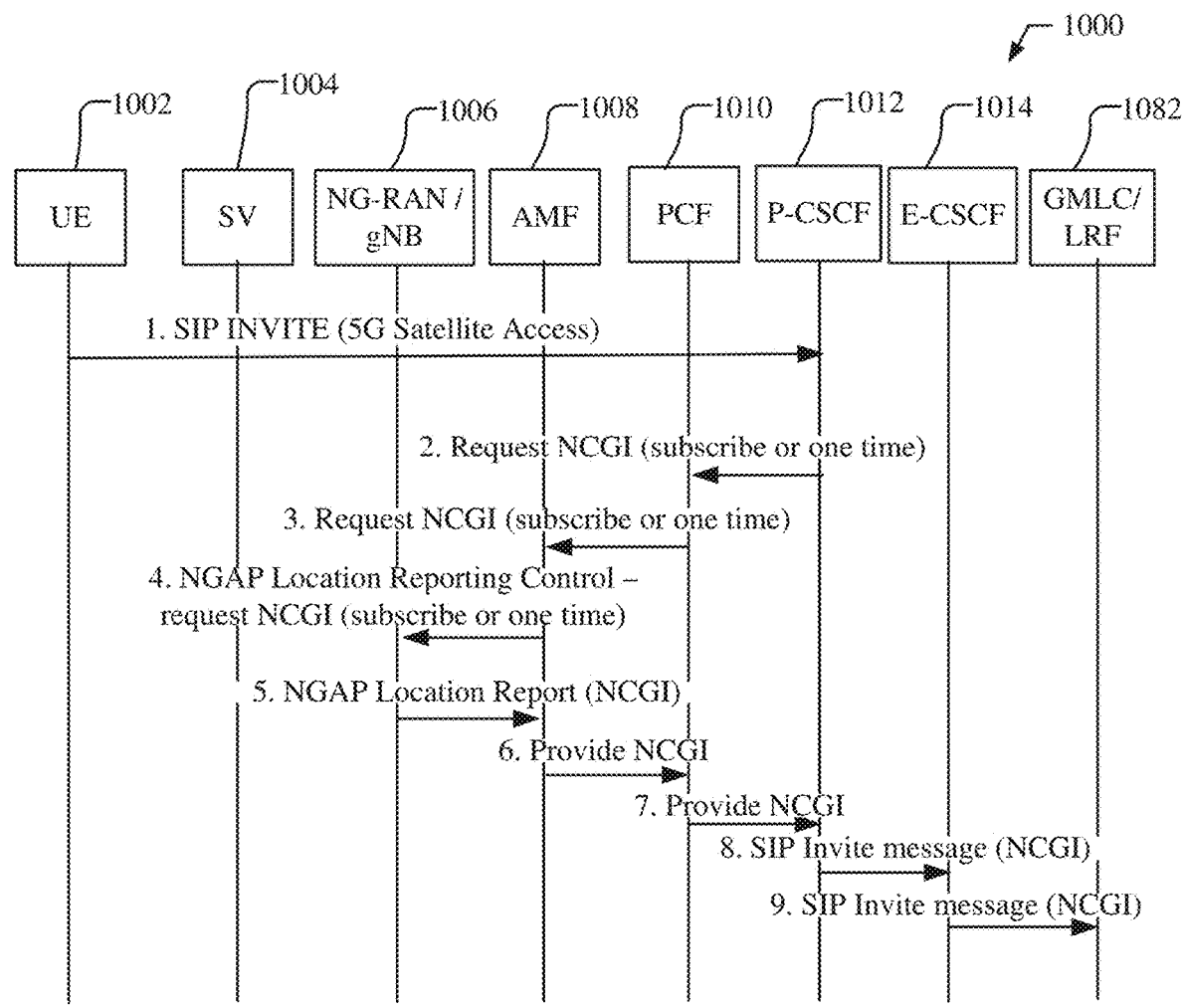
FIG. 10 illustrates a signaling flow with various messages sent between components of a communication system in an emergency call procedure.

FIG. 10 shows a signaling flow 1000 that illustrates various messages sent between components of a communication system in an emergency call procedure and illustrates the solution for Option D. The signaling flow 1000 may be performed by entities in the network architectures 100, 200, or 300, in which the UE 1002 corresponds to UE 105, SV 1004 corresponds to SV 102, 202 or 302, NG-RAN/gNB 1006 corresponds to gNB 106/202/307, the AMF 1008 corresponds to AMF 122, PCF 1010 is a Policy Control Function in the serving 5GCN 110 for UE 1002, P-CSCF 1012 is a Proxy-Call Session Control Function, E-CSCF 1014 is an Emergency-Call Session Control Function, and LRF 1082 corresponds to LRF 125.

At stage 1, the UE 1002 sends, via SV 1004, gNB 1006 and a UPF (not shown in FIG. 10 but analogous to UPF 130 in FIGS. 1-3), a SIP INVITE message that is received by P-CSCF 1012. The SIP INVITE message may be sent for an emergency services call. The message may include an indication that the UE 1002 has 5G satellite access (e.g. for NR). For example, the indication may be included in a P-Access-Network-Info header of the SIP INVITE message.

At stage 2, the P-CSCF 1012 obtains the NCGI for a fixed cell in which the UE 1002 is located from another entity in the serving 5GCN 110 such as the AMF 1008, PCF 1010 or an SMF (not shown in FIG. 10 but analogous to SMF 134 in FIGS. 1-3). In the example shown in FIG. 10, the P-CSCF 1012 requests the UE serving NCGI from the PCF 1010. For example, stage 2 may be performed by the P-CSCF 1012 based on receipt of the 5G satellite access indication at stage 1. The P-CSCF 1012 may subscribe for notification of any changes to the NCGI, e.g., using an Npcf_PolicyAuthorization subscribe and notify (as defined in 3GPP TS 23.502, 23.503) or using an Rx interface (as defined in 3GPP TS 29.214 and TS 29.061) or may request a one time indication of the NCGI, e.g. using these same messages.

At stage 3, the PCF 1010 may request the NCGI from the AMF 1008, when the UE 1002 has 5G Satellite access. The PCF 1010 may request a subscription to receive updated NCGI from the AMF 1008, e.g., using an Namf_EventExposure_subscribe service operation as defined in 3GPP TS 29.518 which may occur before stage 2 or when the request in stage 2 is received, or the PCF 1010 may request a one time indication of the latest NCGI from the AMF 1008 when a one time request is received from a P-CSCF 1012 for the NCGI at stage 2 to reduce signaling and processing.

If AMF 1008 already has a current NCGI for the UE 1002 (e.g. received from gNB 1006 in an NGAP message as, or similarly to that, described for stage 13 of FIGS. 9A and 9B), stages 4 and 5 may be skipped. Otherwise at stage 4, the AMF 1008 may request the NCGI from the NG-RAN/gNB 1006, by sending an NGAP Location Reporting Control request message to gNB 1006 as defined in 3GPP TS 38.413. The request may be for the NG-RAN/gNB 1006 to either monitor for changes of NCGI and report this back to the AMF 1008, e.g., if the PCF 1010 requested a subscription to receive updated NCGI in stage 3, or to request the current NCGI one time only, if the PCF 1010 requested a one time indication of the latest NCGI, to ensure that the PCF 1010 (and thus the P-CSCF 1012) always has access to the most current NCGI.

At stage 5, the NG-RAN/gNB 1006 may determine the UE 1002 location (e.g. from the coverage area of a current serving radio cell for the UE 1002 and/or from location information or measurements obtained by the NG-RAN/gNB 1006 of UE 1002 or provided to NG-RAN/gNB 1006 by UE 1002). NG-RAN/gNB 1006 may then map the location to an NCGI and provides the NCGI to the AMF 1008 in an NGAP Location Report message, according to the request from stage 4, e.g., as a one time indication, or whenever a change in the NCGI is detected.

At stage 6, the AMF 1008 provides the NCGI that the AMF 1008 already has or the NCGI received at stage 5 to the PCF 1010 according to the request from stage 3, e.g., as a one time indication, or whenever a change in the NCGI is detected.

At stage 7, the PCF 1010 provides the NCGI to the P-CSCF 1012 according to the request from stage 2, e.g., as a one time indication, or whenever a change in the NCGI is detected.

At stage 8, the P-CSCF 1012 includes the NCGI in the SIP INVITE, e.g. in the P-Access-Network-Info header field, as defined in TS 24.229, from where it can be retrieved by E-CSCF 1014 or LRF 1082—as shown in stage 9. E-CSCF 1014 or LRF 1082 may then use the NCGI to route the SIP INVITE to or towards a destination entity such as a PSAP (not shown in FIG. 10). For example, E-CSCF 1014 or LRF 1082 may have a database that indicates a destination entity to which the SIP INVITE should be routed for any particular NCGI. The destination entity may have a service area where UEs in the service area can receive service (e.g. for an emergency services call) from the destination entity. The destination entity may be indicated in the database for the NCGI when the fixed geographic area for the fixed cell indicated by the NCGI is within or partly within the service area for the destination entity. E-CSCF 1014 or LRF 1082 may also use the NCGI to determine an approximate location for the UE 1002 and provide that to the PSAP—e.g. when LRF 1082 receives a location request from the PSAP for UE 1002 (not shown in FIG. 10). For example, the approximate location determined for the UE 1002 may be an approximate location corresponding to the fixed geographic area for the fixed cell indicated by the NCGI. For example, the approximate location might be a center or a centroid for the fixed geographic area.

Although FIG. 10 illustrates the solution for Option D for a UE 1002 with 5G NR satellite access such as a UE 105 in any of network architectures 100, 200 or 300 in FIG. 1, 2 or 3, respectively, a variant of FIG. 10 can illustrate the solution for Option D for a UE 1002 with some other type of satellite access such as 4G LTE based satellite access or a later 6G based satellite access. The variant could include entities and stages similar or identical to those shown and described above for FIG. 10. For example, UE 1002 could be configured to support the other type of satellite access; NG-RAN/gNB 1006 could be replaced by a base station for the other types of satellite access (e.g. an eNB or enhanced eNB in the case of 4G LTE satellite access); AMF 1008 could be replaced by a network node supporting mobility management for the other type of satellite access (e.g. an MME in the case of 4G LTE satellite access); PCF 1010 could be replaced by another type of PCF supporting policy control for the other type of satellite access; and P-CSCF 1012, E-CSCF 1014 and LRF 1082 might be the same as or almost the same as in FIG. 10. The various stages in FIG. 10 may then occur as described previously with the entities described above replacing the entities shown in FIG. 10. The only other difference in the previously described stages may then comprise: for stage 1, UE 1002 inclusion of an indication in the SIP INVITE that the UE 1002 has satellite access for the other type of access (rather than for 5G) such as satellite access for 4G LTE; and, for stages 2-9, use of another type of cell identifier applicable to the other type of access instead of the NCGI referred to above. In this other variant, the use of a satellite access indication as provided by UE 1002 in the SIP INVITE sent at stage 1 may remain the same.

Figure 11:
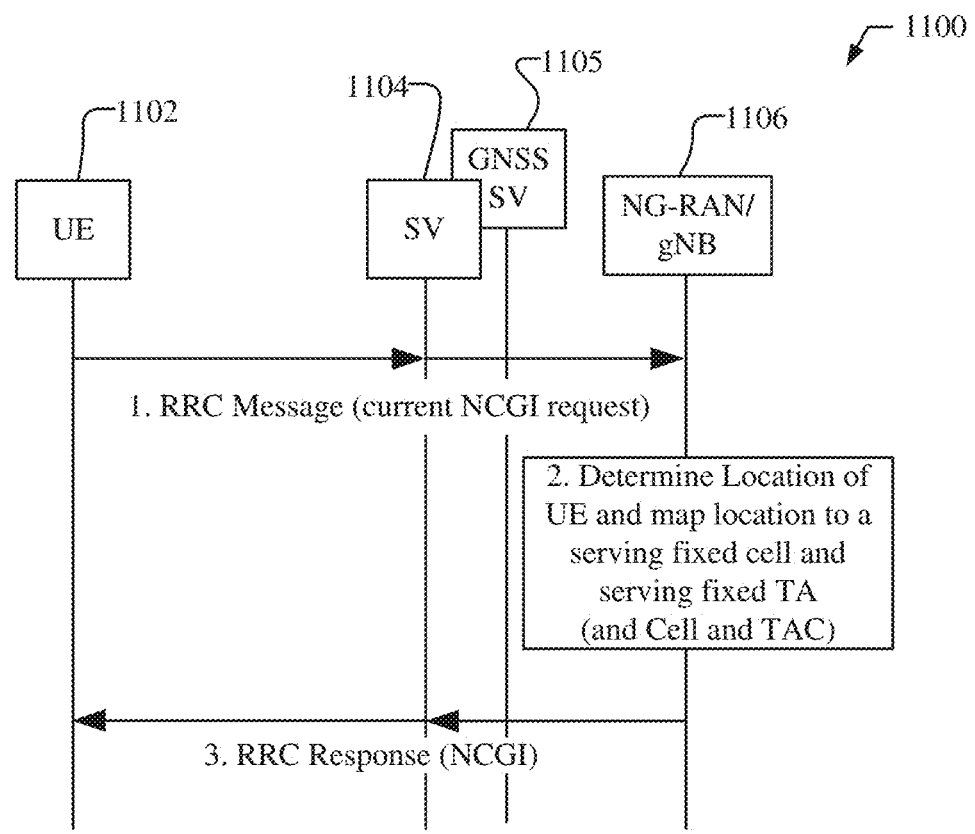
FIG. 11 illustrates a signaling flow for base station determination of a cell identity.

FIG. 11 shows a signaling flow 1100 that illustrates various messages sent between components of a communication system in a procedure that illustrates the solution for Option F. The signaling flow 1100 may be performed by entities in the network architectures 100, 200, or 300, in which the UE 1102 corresponds to UE 105, SV 1104 corresponds to SV 102, 202 or 302, GNSS SV 1105 corresponds to SV 190, gNB 1106 corresponds to gNB 106/202/307.

At stage 1, UE 1102 sends an RRC message to the gNB 1106 requesting the fixed cell ID (e.g., NGCI) in which IE 1102 is located. The RRC message, for example, may be an RRC Setup Complete or an RRC UL Information Transfer message or some other RRC message.

At stage 2, the gNB 1106, or an embedded or attached Location Management Component (LMC), may determine a location and optionally a country for UE 1102, e.g. from the coverage area of a current serving radio cell for the UE 1102 and/or from location information or UL measurements obtained by the NG-RAN/gNB 1106 of UE 1102 or provided to NG-RAN/gNB 1106 by UE 1002 (e.g., DL location measurements or a UE 1102 location included in the RRC message sent at stage 1). The gNB 1106 then maps the location to a fixed serving cell based on configuration information for fixed cells to generate a fixed cell ID (e.g., NGCI).

At stage 3, the gNB 1106 sends an RRC response message to the UE 1102 that includes the current fixed cell ID (e.g., NGCI).

Figure 12:
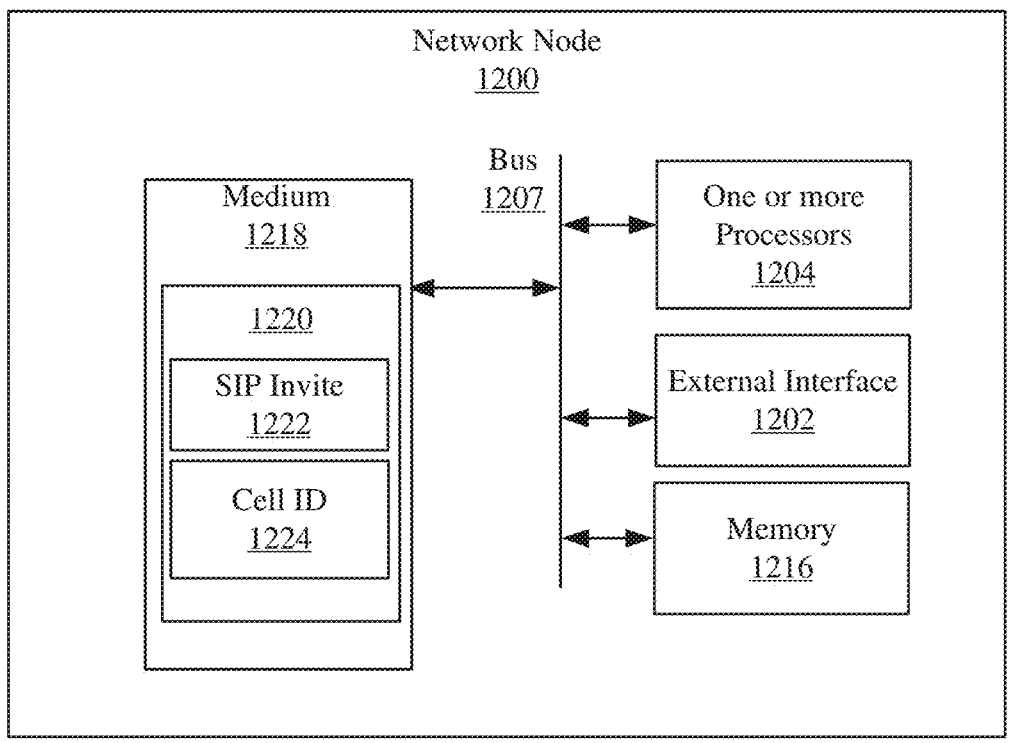
FIG. 12 illustrates a diagram illustrating an example of a hardware implementation of a network node configured to support satellite wireless access by a UE to a serving PLMN.

FIG. 12 is a diagram illustrating an example of a hardware implementation of a network node 1200 in a PLMN configured to support satellite wireless access by a UE to a serving PLMN, as discussed herein. The network node, for example, may be the P-CSCF 1012, E-CSCF 1014 or PCF 1010, shown in FIG. 10, the AMF 708, 808, 908 or 1008 shown in FIGS. 7-10, or the gNB 1106 shown in FIG. 11. The network node 1200 may be configured to perform the signal flow of FIG. 10 or any of the signal flows of FIG. 7, 8, 9A, 9B or 11. The network node 1200 includes, e.g., hardware components such as an external interface 1202 configured to communicate with other network components in the PLMN. The network node 1200 includes one or more processors 1204, memory 1216, and non-transitory computer readable medium 1218, which may be coupled together with bus 1207.

The one or more processors 1204 may be implemented using a combination of hardware, firmware, and software. For example, the one or more processors 1204 may be configured to perform the functions discussed herein by implementing one or more instructions or program code 1220 on a non-transitory computer readable medium, such as medium 1218 and/or memory 1216. In some embodiments, the one or more processors 1204 may represent one or more circuits configurable to perform at least a portion of a data signal computing procedure or process related to the operation of network node 1200.

Figure 14:
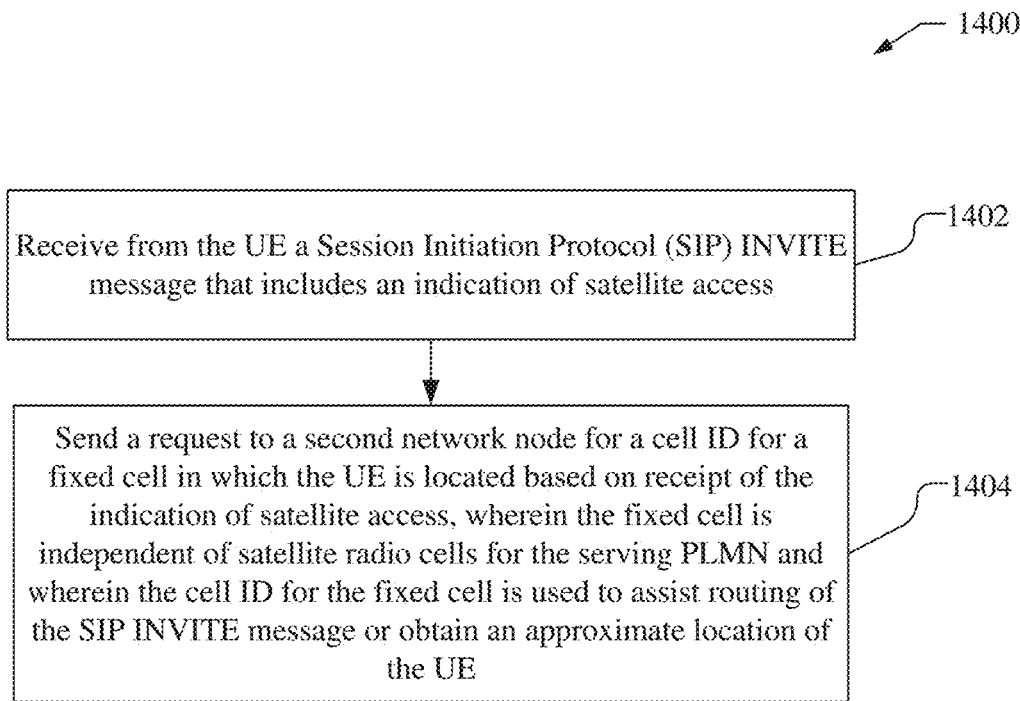
FIG. 14 illustrates a flowchart of an example procedure for supporting satellite wireless access by a user equipment to a serving PLMN.

The medium 1218 and/or memory 1216 may store instructions or program code 1220 that contain executable code or software instructions that when executed by the one or more processors 1204 cause the one or more processors 1204 to operate as a special purpose computer programmed to perform the techniques disclosed herein (e.g. such as the signal flows of any of FIGS. 7 to 11 and the process flow 1400 of FIG. 14). As illustrated in network node 1200, the medium 1218 and/or memory 1216 may include one or more components or modules that may be implemented by the one or more processors 1204 to perform the methodologies described herein. While the components or modules are illustrated as software in medium 1218 that is executable by the one or more processors 1204, it should be understood that the components or modules may be stored in memory 1216 or may be dedicated hardware either in the one or more processors 1204 or off the processors.

A number of software modules and data tables may reside in the medium 1218 and/or memory 1216 and be utilized by the one or more processors 1204 in order to manage both communications and the functionality described herein. It should be appreciated that the organization of the contents of the medium 1218 and/or memory 1216 as shown in network node 1200 is merely exemplary, and as such the functionality of the modules and/or data structures may be combined, separated, and/or be structured in different ways depending upon the implementation of the network node 1200. While the components or modules are illustrated as software in medium 1218 and/or memory 1216 that is executable by the one or more processors 1204, it should be understood that the components or modules may be firmware or dedicated hardware either in the one or more processors 1204 or off the processors.

As illustrated, the program code 1220 stored on medium 1218 and/or memory 1216 may include a SIP Invite module 1222 that when implemented by the one or more processors 1204 configures the one or more processors 1204 to receive, via external interface 1202, from a UE (e.g. a UE 105 or UE 1002) a SIP INVITE message from the UE that includes an indication of satellite access (e.g. 5G satellite access) by the UE. The one or more processors 1204 may be further configured to send the SIP INVITE message to another network node, such as an E-CSCF 1014 or LRF 1082, once a cell ID (e.g. an NCGI) for the fixed cell in which the UE is located has been obtained.

The program code 1220 stored on medium 1218 and/or memory 1216 may include a cell ID module 1224 that when implemented by the one or more processors 1204 configures the one or more processors 1204 to send, via the external interface 1202, a request to a network node, such as a PCF 1010, for a cell ID for a fixed cell in which the UE is located based on a receipt of an indication of satellite access by the UE, where the fixed cell is independent of satellite radio cells for the serving PLMN and where the cell ID for the fixed cell is used to assist routing of the SIP INVITE message or obtain an approximate location of the UE. The one or more processors 1204 may be further configured to receive, via the external interface, a response from the network node with the cell ID for the fixed cell in which the UE is located.

The methodologies described herein may be implemented by various means depending upon the application. For example, these methodologies may be implemented in hardware, firmware, software, or any combination thereof. For a hardware implementation, the one or more processors 1204 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of network node 1200 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1218 or memory 1216 and executed by one or more processors 1204, causing the one or more processors 1204 to operate as a special purpose computer programmed to perform the techniques to support satellite wireless access by a UE to a serving PLMN as disclosed herein. Memory may be implemented within the one or more processors 1204 or external to the one or more processors 1204. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by network node 1200 may be stored as one or more instructions or code on a non-transitory computer-readable storage medium such as medium 1218 or memory 1216. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for network node 1200 may be provided as signals on transmission media included in a communication apparatus. For example, a communication apparatus comprising part or all of network node 1200 may include a transceiver having signals indicative of instructions and data. The instructions and data are stored on non-transitory computer readable media, e.g., medium 1218 or memory 1216, and are configured to cause the one or more processors 1204 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 13:
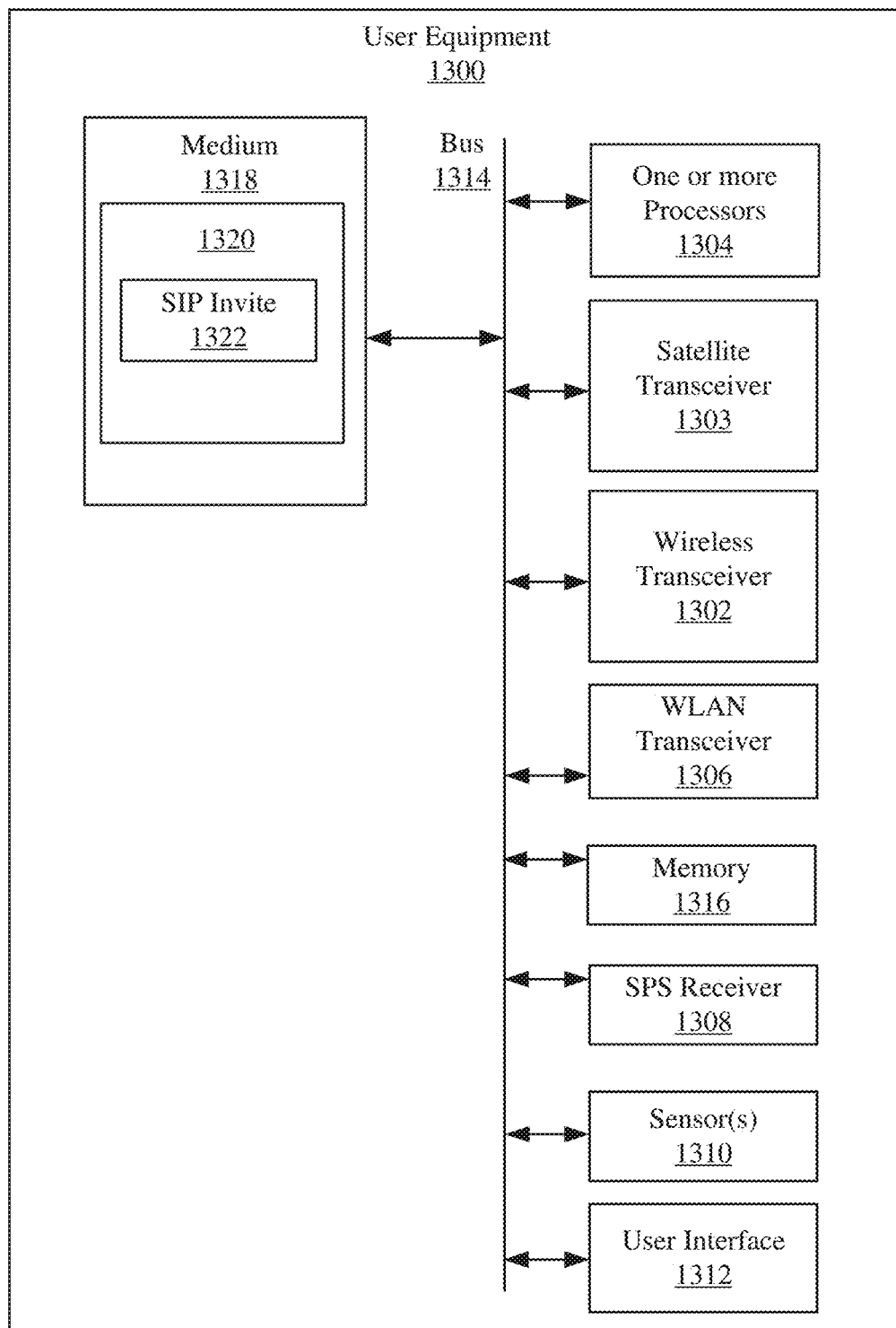
FIG. 13 illustrates a diagram illustrating an example of a hardware implementation of a UE configured to support satellite wireless access by a UE to a serving PLMN.

FIG. 13 is a diagram illustrating an example of a hardware implementation of a UE 1300 configured to support satellite wireless access to a serving PLMN, as discussed herein. The UE 1300, for example, may be a UE 105 shown in FIGS. 1, 2, and 3, UE 702 in FIG. 7, UE 802 in FIG. 8, UE 902 in FIGS. 9A and 9B, UE 1002 in FIG. 10, or UE 1102 in FIG. 11. The UE 1300 may be configured to perform any of the signal flows in FIGS. 7 to 11. The UE 1300 may include, e.g., hardware components such as a satellite transceiver 1303 to wirelessly communicate with a SV 102/202/302 or other communication SV via a wireless antenna (not shown in FIG. 13), e.g., as shown in FIGS. 1, 2, and 3. The UE 1300 may further include a wireless transceiver 1302 to wirelessly communicate with terrestrial base stations in an NG-RAN 112 via a wireless antenna (not shown in FIG. 13), e.g., base stations such as a gNB 106/202/307, an eNB or an ng-eNB. The UE 1300 may also include additional transceivers, such a wireless local area network (WLAN) transceiver 1306, as well as an SPS receiver 1308 for receiving and measuring signals from SPS SVs 190 (shown in FIGS. 1, 2, and 3) via a wireless antenna (not shown in FIG. 13). In some implementations, the UE 1300 may receive data from a satellite, e.g., via satellite transceiver 1303, and may respond to a terrestrial base station, e.g., via wireless transceiver 1302, or via WLAN transceiver 1306. Thus, UE 1300 may include one or more transmitters, one or more receivers or both, and these may be integrated, discrete, or a combination of both. The UE 1300 may further include one or more sensors 1310, such as cameras, accelerometers, gyroscopes, electronic compass, magnetometer, barometer, etc. The UE 1300 may further include a user interface 1312 that may include e.g., a display, a keypad or other input device, such as virtual keypad on the display, through which a user may interface with the UE 1300. The UE 1300 further includes one or more processors 1304, memory 1316, and non-transitory computer readable medium 1318, which may be coupled together with bus 1314. The one or more processors 1304 and other components of the UE 1300 may similarly be coupled together with bus 1314, a separate bus, or may be directly connected together or coupled using a combination of the foregoing.

The one or more processors 1304 may be implemented using a combination of hardware, firmware, and software. For example, the one or more processors 1304 may be configured to perform the functions discussed herein by implementing one or more instructions or program code 1320 on a non-transitory computer readable medium, such as medium 1318 and/or memory 1316. In some embodiments, the one or more processors 1304 may represent one or more circuits configurable to perform at least a portion of a data signal computing procedure or process related to the operation of UE 1300.

Figure 15:
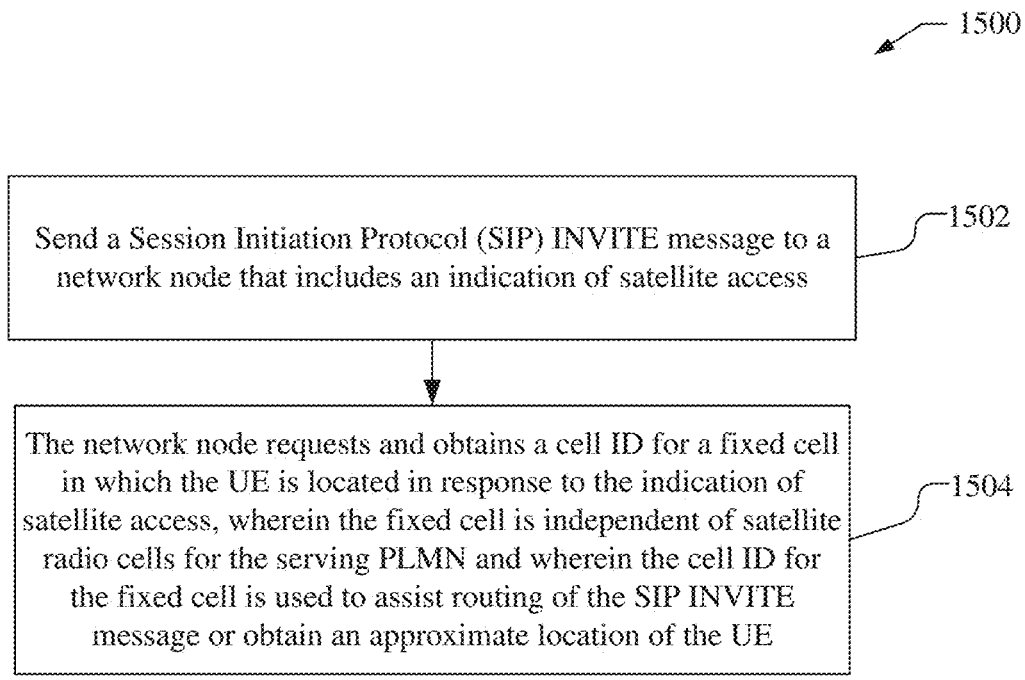
FIG. 15 illustrates a flowchart of an example procedure for supporting satellite wireless access by a user equipment to a serving PLMN.

The medium 1318 and/or memory 1316 may store instructions or program code 1320 that contain executable code or software instructions that when executed by the one or more processors 1304 cause the one or more processors 1304 to operate as a special purpose computer programmed to perform the techniques disclosed herein (e.g. such as the signal flow of FIG. 10 and the process flow 1500 of FIG. 15). As illustrated in UE 1300, the medium 1318 and/or memory 1316 may include one or more components or modules that may be implemented by the one or more processors 1304 to perform the methodologies described herein. While the components or modules are illustrated as software in medium 1318 that is executable by the one or more processors 1304, it should be understood that the components or modules may be stored in memory 1316 or may be dedicated hardware either in the one or more processors 1304 or off the processors.

A number of software modules and data tables may reside in the medium 1318 and/or memory 1316 and be utilized by the one or more processors 1304 in order to manage both communications and the functionality described herein. It should be appreciated that the organization of the contents of the medium 1318 and/or memory 1316 as shown in UE 1300 is merely exemplary, and as such the functionality of the modules and/or data structures may be combined, separated, and/or be structured in different ways depending upon the implementation of the UE 1300. While the components or modules are illustrated as software in medium 1318 and/or memory 1316 that is executable by the one or more processors 1304, it should be understood that the components or modules may be firmware or dedicated hardware either in the one or more processors 1304 or off the processors.

As illustrated, the program code 1320 stored on medium 1318 and/or memory 1316 may include a SIP Invite module 1322 that when implemented by the one or more processors 1304 configures the one or more processors 1304 to send, via the satellite transceiver 1303, a Session Initiation Protocol (SIP) INVITE message to a network node, such as a P-CSCF 1012 that includes an indication of satellite access (e.g. 5G satellite access). The network node may request and obtain a cell ID for a fixed cell (e.g. an NGCI) in which the UE is located in response to the indication of satellite access, where the fixed cell is independent of satellite radio cells for the serving PLMN and where the cell ID for the fixed cell is used to assist routing of the SIP INVITE message and/or obtain an approximate location of the UE 1300.

The methodologies described herein may be implemented by various means depending upon the application. For example, these methodologies may be implemented in hardware, firmware, software, or any combination thereof. For a hardware implementation, the one or more processors 1304 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1300 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1318 or memory 1316 and executed by one or more processors 1304, causing the one or more processors 1304 to operate as a special purpose computer programmed to perform the techniques to support satellite wireless access by a UE to a serving PLMN as disclosed herein. Memory may be implemented within the one or processors 1304 or external to the one or more processors 1304. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1300 may be stored as one or more instructions or code on a non-transitory computer-readable storage medium such as medium 1318 or memory 1316. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1300 may be provided as signals on transmission media included in a communication apparatus. For example, a communication apparatus comprising part or all of UE 1300 may include a transceiver having signals indicative of instructions and data. The instructions and data are stored on non-transitory computer readable medium 1318 or memory 1316, and are configured to cause the one or more processors 1304 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

FIG. 14 shows a flowchart of an example procedure 1400 for supporting satellite wireless access by a user equipment (e.g. a UE 105, UE 1002 or UE 1300) to a serving public land mobile network (PLMN), performed by a first network node, such as a P-CSCF 1012 shown in FIG. 10.

As illustrated, at block 1402, the first network node receives from the UE a Session Initiation Protocol (SIP) INVITE message that includes an indication of satellite access (e.g. satellite access by the UE), e.g., as illustrated in stage 1 of FIG. 10 and described in relation to Option D herein. A means for receiving from the UE a Session Initiation Protocol (SIP) INVITE message that includes an indication of satellite access may be, e.g., the external interface 1202 and one or more processors 1204 with dedicated hardware or implementing executable code or software instructions in memory 1216 and/or medium 1218, such as the SIP Invite module 1222, in the network node 1200 in FIG. 12.

At block 1404, the first network node may send a request to a second network node (e.g. a PCF 1010) for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE, e.g., as illustrated in stages 2 to 9 of FIG. 10 and described in relation to Option D herein. In some implementations, the indication of satellite access is an indication of 5G satellite access for New Radio (NR) or an indication of 4G satellite access for Long Term Evolution (LTE). In some implementations, the SIP INVITE message is received for an emergency services call. In one implementation, the request for the cell ID is for a one time indication of the cell ID or a subscription for updated indications of the cell ID, e.g., as discussed in reference to stages 2 and 3 of FIG. 10. A means for sending a request to a second network node for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE may be, e.g., the external interface 1202 and one or more processors 1204 with dedicated hardware or implementing executable code or software instructions in memory 1216 and/or medium 1218, such as the cell ID module 1224, in network node 1200 in FIG. 12.

In one implementation, the first network node may further receive a response from the second network node with the cell ID for the fixed cell in which the UE is located, e.g., as illustrated in stage 7 of FIG. 10 and discussed in relation to Option D herein, and may send the SIP INVITE message to a third network node with the cell ID for the fixed cell in which the UE is located, e.g., as illustrated in stage 8 and 9 of FIG. 10 and discussed in relation to Option D herein. A means for receiving a response from the second network node with the cell ID for the fixed cell in which the UE is located may be, e.g., the external interface 1202 and one or more processors 1204 with dedicated hardware or implementing executable code or software instructions in memory 1216 and/or medium 1218, such as the cell ID module 1224, in network node 1200 in FIG. 12. In one implementation, the third network node may be an Emergency-Call Session Control Function (e.g. E-CSCF 1014) or a Location Retrieval Function (e.g. LRF 1082), e.g., as illustrated in stages 8 and 9 of FIG. 10. A means for sending the SIP INVITE message to a third network node with the cell ID for the fixed cell in which the UE is located may be, e.g., the external interface 1202 and one or more processors 1204 with dedicated hardware or implementing executable code or software instructions in memory 1216 and/or medium 1218, such as the SIP Invite module 1222, in the network node 1200 in FIG. 12.

FIG. 15 shows a flowchart of an example procedure 1500 for supporting satellite wireless access by a user equipment (UE) to a serving public land mobile network (PLMN), performed by a UE, such as UE 105 shown in FIGS. 1-3, UE 1002 shown in FIG. 10 or UE 1300 shown in FIG. 13.

As illustrated, at block 1502, the UE sends a Session Initiation Protocol (SIP) INVITE message to a network node that includes an indication of satellite access (e.g. satellite access by the UE), e.g., as illustrated in stage 1 of FIG. 10 and described in relation to Option D herein. In one implementation, the network node may be a Proxy-Call Session Control Function (e.g. P-CSCF 1012), as illustrated in FIG. 10. A means for sending a Session Initiation Protocol (SIP) INVITE message to a network node that includes an indication of satellite access may be, e.g., the satellite transceiver 1303 and one or more processors 1304 with dedicated hardware or implementing executable code or software instructions in memory 1316 and/or medium 1318, such as the SIP invite module 1322, in the UE 1300 in FIG. 13.

At block 1504, the network node requests and obtains a cell ID for a fixed cell in which the UE is located in response to the indication of satellite access, wherein the fixed cell is independent of satellite radio cells for the serving PLMN and wherein the cell ID for the fixed cell is used to assist routing of the SIP INVUTE message or obtain an approximate location of the UE, e.g., as illustrated in stages 1 and 9 of FIG. 10 and described in relation to Option D herein. In some implementations, the indication of satellite access is an indication of 5G satellite access for New Radio (NR) or an indication of 4G satellite access for Long Term Evolution (LTE). In some implementations, the SIP INVITE message is sent for an emergency services call. In one implementation, the network node requests and obtains the cell ID as a one time indication of the cell ID or a subscription for updated indications of the cell ID, e.g., as illustrated in stages 2 and 3 of FIG. 10. In one implementation, the SIP INVITE message is routed to an Emergency-Call Session Control Function (e.g. E-CSCF 1014) or a Location Retrieval Function (e.g. LRF 1082) with the cell ID for the fixed cell, e.g., as illustrated in stages 8 and 9 of FIG. 10.

Abbreviations used herein may be identified in Table 1 as follows:

TABLE 1

| EM | Emergency |
| ES | Earth Station |

TABLE 1-continued

| GEO | Geostationary Earth Orbit |
| ISL | Inter-Satellite Links |
| LEO | Low Earth Orbit |
| LI | Lawful Interception |
| MEO | Medium Earth Orbit |
| MNO | Mobile Network Operator |
| NGEO | Non-Geostationary Earth Orbiting |
| NTN | Non-Terrestrial Network |
| gNB | satellite Node B |
| SV | Space Vehicle |
| SVO | SV Operator |
| TA | Tracking Area |
| TAC | Tracking Area Code |
| TAI | Tracking Area Identity |
| WEA | Wireless Emergency Alerting |

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

In view of this description, embodiments may include different combinations of features. Implementation examples are described in the following numbered clauses:

Clause 1. A method for supporting satellite wireless access by a user equipment (UE) to a serving public land mobile network (PLMN), performed by a first network node, the method comprising: receiving from the UE a Session Initiation Protocol (SIP) INVITE message that includes an indication of satellite access; and sending a request to a second network node for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE.

Clause 2. The method of clause 1, wherein the indication of satellite access is an indication of 5G satellite access for New Radio (NR) or an indication of 4G satellite access for Long Term Evolution (LTE).

Clause 3. The method any of clauses 1-2, wherein the SIP INVITE message is received for an emergency services call.

Clause 4. The method any of clauses 1-3, wherein the first network node comprises a Proxy-Call Session Control Function (P-CSCF).

Clause 5. The method any of clauses 1-4, wherein the second network node comprises a Policy Control Function (PCF).

Clause 6. The method any of clauses 1-5, wherein the request for the cell ID is for a one time indication of the cell ID or a subscription for updated indications of the cell ID.

Clause 7. The method any of clauses 1-6, further comprising: receiving a response from the second network node with the cell ID for the fixed cell in which the UE is located; and sending the SIP INVITE message to a third network node with the cell ID for the fixed cell in which the UE is located.

Clause 8. The method of clause 7, wherein the third network node comprises an Emergency-Call Session Control Function (E-CSCF) or a Location Retrieval Function (LRF).

Clause 9. A first network node configured to support satellite wireless access by a user equipment (UE) to a serving public land mobile network (PLMN), comprising: an external interface configured to communicate with network entities; at least one memory; at least one processor coupled to the external interface and the at least one memory, wherein the at least one processor is configured to: receive, via the external interface, from the UE a Session Initiation Protocol (SIP) INVITE message that includes an indication of satellite access; and send, via the external interface, a request to a second network node for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE.

Clause 10. The first network node of clause 9, wherein the indication of satellite access is an indication of 5G satellite access for New Radio (NR) or an indication of 4G satellite access for Long Term Evolution (LTE).

Clause 11. The first network node any of clauses 9-10, wherein the SIP INVITE message is received for an emergency services call.

Clause 12. The first network node any of clauses 9-11, wherein the first network node comprises a Proxy-Call Session Control Function (P-CSCF).

Clause 13. The first network node any of clauses 9-12, wherein the second network node comprises a Policy Control Function (PCF).

Clause 14. The first network node any of clauses 9-13, wherein the request for the cell ID is for a one time indication of the cell ID or a subscription for updated indications of the cell ID.

Clause 15. The first network node any of clauses 9-14, wherein the at least one processor is further configured to: receive, via the external interface, a response from the second network node with the cell ID for the fixed cell in which the UE is located; and send, via the external interface, the SIP INVITE message to a third network node with the cell ID for the fixed cell in which the UE is located.

Clause 16. The first network node of clause 15, wherein the third network node comprises an Emergency-Call Session Control Function (E-CSCF) or a Location Retrieval Function (LRF).

Clause 17. A first network node configured to support satellite wireless access by a user equipment (UE) to a serving public land mobile network (PLMN), comprising: means for receiving from the UE a Session Initiation Protocol (SIP) INVITE message that includes an indication of satellite access; and means for sending a request to a second network node for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE.

Clause 18. The first network node of clause 17, wherein the indication of satellite access is an indication of 5G satellite access for New Radio (NR) or an indication of 4G satellite access for Long Term Evolution (LTE).

Clause 19. The first network node any of clauses 17-18, wherein the SIP INVITE message is received for an emergency services call.

Clause 20. The first network node any of clauses 17-19, wherein the first network node comprises a Proxy-Call Session Control Function (P-CSCF).

Clause 21. The first network node any of clauses 17-20, wherein the second network node comprises a Policy Control Function (PCF).

Clause 22. The first network node any of clauses 17-21, wherein the request for the cell ID is for a one time indication of the cell ID or a subscription for updated indications of the cell ID.

Clause 23. The first network node any of clauses 17-22, further comprising: means for receiving a response from the second network node with the cell ID for the fixed cell in which the UE is located; and means for sending the SIP INVITE message to a third network node with the cell ID for the fixed cell in which the UE is located.

Clause 24. The first network node of clause 23, wherein the third network node comprises an Emergency-Call Session Control Function (E-CSCF) or a Location Retrieval Function (LRF).

Clause 25. A non-transitory storage medium including program code stored thereon, the program code is operable to configure at least one processor in a first network node to support satellite wireless access by a user equipment (UE) to a serving public land mobile network (PLMN), the program code comprising instructions to: receive from the UE a Session Initiation Protocol (SIP) INVITE message that includes an indication of satellite access; and send a request to a second network node for a cell ID for a fixed cell in which the UE is located based on receipt of the indication of satellite access, wherein the fixed cell is independent of satellite radio cells for the serving PLMN and wherein the cell ID for the fixed cell is used to assist routing of the SIP INVITE message or obtain an approximate location of the UE.

Clause 26. The non-transitory storage medium of clause 25, wherein the indication of satellite access is an indication of 5G satellite access for New Radio (NR) or an indication of 4G satellite access for Long Term Evolution (LTE).

Clause 27. The non-transitory storage medium any of clauses 25-26, wherein the SIP INVITE message is received for an emergency services call.

Clause 28. The non-transitory storage medium any of clauses 25-27, wherein the first network node comprises a Proxy-Call Session Control Function (P-CSCF).

Clause 29. The non-transitory storage medium any of clauses 25-28, wherein the second network node comprises a Policy Control Function (PCF).

Clause 30. The non-transitory storage medium any of clauses 25-39, wherein the request for the cell ID is for a one time indication of the cell ID or a subscription for updated indications of the cell ID.

Clause 31. The non-transitory storage medium any of clauses 25-30, wherein the program code further comprises instructions to: receive a response from the second network node with the cell ID for the fixed cell in which the UE is located; and send the SIP INVITE message to a third network node with the cell ID for the fixed cell in which the UE is located.

Clause 32. The non-transitory storage medium of clause 31, wherein the third network node comprises an Emergency-Call Session Control Function (E-CSCF) or a Location Retrieval Function (LRF).

Clause 33. A method for supporting satellite wireless access by a user equipment (UE) to a serving public land mobile network (PLMN), performed by the UE, the method comprising: sending a Session Initiation Protocol (SIP) INVITE message to a network node that includes an indication of satellite access; and wherein the network node requests and obtains a cell ID for a fixed cell in which the UE is located in response to the indication of satellite access, wherein the fixed cell is independent of satellite radio cells for the serving PLMN and wherein the cell ID for the fixed cell is used to assist routing of the SIP INVITE message or obtain an approximate location of the UE.

Clause 34. The method of clause 33, wherein the indication of satellite access is an indication of 5G satellite access for New Radio (NR) or an indication of 4G satellite access for Long Term Evolution (LTE).

Clause 35. The method any of clauses 33-34, wherein the SIP INVITE message is sent for an emergency services call.

Clause 36. The method any of clauses 33-35, wherein the network node comprises a Proxy-Call Session Control Function (P-CSCF).

Clause 37. The method any of clauses 33-36, wherein the network node requests and obtains the cell ID as a one time indication of the cell ID or a subscription for updated indications of the cell ID.

Clause 38. The method any of clauses 33-37, wherein the SIP INVITE message is routed to an Emergency-Call Session Control Function (E-CSCF) or a Location Retrieval Function (LRF) with the cell ID for the fixed cell.

Clause 39. A user equipment (UE) configured to support satellite wireless access by the UE to a serving public land mobile network (PLMN), comprising: a wireless transceiver configured to wirelessly communicate with a communication satellite; at least one memory; at least one processor coupled to the wireless transceiver and the at least one memory, wherein the at least one processor is configured to: send, via the wireless transceiver, a Session Initiation Protocol (SIP) INVITE message to a network node that includes an indication of satellite access; and wherein the network node requests and obtains a cell ID for a fixed cell in which the UE is located in response to the indication of satellite access, wherein the fixed cell is independent of satellite radio cells for the serving PLMN and wherein the cell ID for the fixed cell is used to assist routing of the SIP INVITE message or obtain an approximate location of the UE.

Clause 40. The UE of clause 39, wherein the indication of satellite access is an indication of 5G satellite access for New Radio (NR) or an indication of 4G satellite access for Long Term Evolution (LTE).

Clause 41. The UE any of clauses 39-40, wherein the SIP INVITE message is sent for an emergency services call.

Clause 42. The UE any of clauses 39-41, wherein the network node comprises a Proxy-Call Session Control Function (P-CSCF).

Clause 43. The UE any of clauses 39-2, wherein the network node requests and obtains the cell ID as a one time indication of the cell ID or a subscription for updated indications of the cell ID.

Clause 44. The UE any of clauses 39-43, wherein the SIP INVITE message is routed to an Emergency-Call Session Control Function (E-CSCF) or a Location Retrieval Function (LRF) with the cell ID for the fixed cell.

Clause 45. A user equipment (UE) configured to support satellite wireless access by the UE to a serving public land mobile network (PLMN), comprising: means for sending a Session Initiation Protocol (SIP) INVITE message to a network node that includes an indication of satellite access; and wherein the network node requests and obtains a cell ID for a fixed cell in which the UE is located in response to the indication of satellite access, wherein the fixed cell is independent of satellite radio cells for the serving PLMN and wherein the cell ID for the fixed cell is used to assist routing of the SIP INVITE message or obtain an approximate location of the UE.

Clause 46. The UE of clause 45, wherein the indication of satellite access is an indication of 5G satellite access for New Radio (NR) or an indication of 4G satellite access for Long Term Evolution (LTE).

Clause 47. The UE any of clauses 45-46, wherein the SIP INVITE message is sent for an emergency services call.

Clause 48. The UE any of clauses 45-47, wherein the network node comprises a Proxy-Call Session Control Function (P-CSCF).

Clause 49. The UE any of clauses 45-48, wherein the network node requests and obtains the cell ID as a one time indication of the cell ID or a subscription for updated indications of the cell ID.

Clause 50. The UE any of clauses 45-49, wherein the SIP INVITE message is routed to an Emergency-Call Session Control Function (E-CSCF) or a Location Retrieval Function (LRF) with the cell ID for the fixed cell.

Clause 51. A non-transitory storage medium including program code stored thereon, the program code is operable to configure at least one processor in a user equipment (UE) to support satellite wireless access by the UE to a serving public land mobile network (PLMN), the program code comprising instructions to: send a Session Initiation Protocol (SIP) INVITE message to a network node that includes an indication of satellite access; and wherein the network node requests and obtains a cell ID for a fixed cell in which the UE is located in response to the indication of satellite access, wherein the fixed cell is independent of satellite radio cells for the serving PLMN and wherein the cell ID for the fixed cell is used to assist routing of the SIP INVITE message or obtain an approximate location of the UE.

Clause 52. The non-transitory storage medium of clause 51, wherein the indication of satellite access is an indication of 5G satellite access for New Radio (NR) or an indication of 4G satellite access for Long Term Evolution (LTE).

Clause 53. The non-transitory storage medium any of clauses 51-52, wherein the SIP INVITE message is sent for an emergency services call.

Clause 54. The non-transitory storage medium any of clauses 51-53, wherein the network node comprises a Proxy-Call Session Control Function (P-CSCF).

Clause 55. The non-transitory storage medium any of clauses 51-54, wherein the network node requests and obtains the cell ID as a one time indication of the cell ID or a subscription for updated indications of the cell ID.

Clause 56. The non-transitory storage medium any of clauses 51-55, wherein the SIP INVITE message is routed to an Emergency-Call Session Control Function (E-CSCF) or a Location Retrieval Function (LRF) with the cell ID for the fixed cell.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting satellite wireless access by a user equipment (UE) to a serving public land mobile network (PLMN), performed by a first network node, the method comprising:
   receiving from the UE a Session Initiation Protocol (SIP) INVITE message, wherein:
      the SIP INVITE message includes an indication that the UE has access to the PLMN via satellite,
      the indication that the UE has access to the PLMN via satellite identifies a serving satellite radio cell for the UE, and
      the serving satellite radio cell has a coverage area associated with one or more satellite-transmitted radio beams; and
   sending a request to a second network node based on the indication that the UE has access to the PLMN via satellite, for location information of the UE, wherein the location information of the UE is used to assist in routing of the SIP INVITE message.

2. The method of claim 1, wherein the SIP INVITE message includes a location of the UE.

3. The method of claim 1, wherein a UE location is determined by the UE.

4. The method of claim 1, wherein a UE location is determined by a network entity and provided to the UE.

5. The method of claim 1, further comprising receiving a UE location from a third network node.

6. The method of claim 1, wherein the indication that the UE has access to the PLMN via satellite comprises an indication of 5G satellite access for New Radio (NR) or an indication of 4G satellite access for Long Term Evolution (LTE).

7. The method of claim 1, wherein the SIP INVITE message is received for an emergency services call.

8. A first network node for supporting satellite wireless access by a user equipment (UE) to a serving public land mobile network (PLMN), the first network node comprising:
- a transceiver;
- a memory; and
- one or more processors communicatively coupled with the transceiver and the memory, wherein the one or more processors are configured to:
  - receive from the UE, via the transceiver, a Session Initiation Protocol (SIP) INVITE message, wherein:
    - the SIP INVITE message includes an indication that the UE has access to the PLMN via satellite,
    - the indication that the UE has access to the PLMN via satellite identifies a serving satellite radio cell for the UE, and
    - the serving satellite radio cell has a coverage area associated with one or more satellite-transmitted radio beams; and
  - send, via the transceiver, a request to a second network node responsive to receiving the indication that the UE has access to the PLMN via satellite, for location information of the UE, wherein the location information of the UE is used to assist in routing of the SIP INVITE message.

9. The first network node of claim 8, wherein the one or more processors are configured to receive, in the SIP INVITE message, a location of the UE.

10. The first network node of claim 8, wherein a UE location is determined by the UE.

11. The first network node of claim 8, wherein a UE location is determined by a network entity and provided to the UE.

12. The first network node of claim 8, wherein the one or more processors are further configured to receive a UE location from a third network node.

13. The first network node of claim 8, wherein the indication that the UE has access to the PLMN via satellite comprises an indication of 5G satellite access for New Radio (NR) or an indication of 4G satellite access for Long Term Evolution (LTE).

14. The first network node of claim 8, wherein the one or more processors are further configured to receive the SIP INVITE message for an emergency services call.

15. An apparatus for supporting satellite wireless access by a user equipment (UE) to a serving public land mobile network (PLMN), the apparatus comprising:
- means for receiving from the UE a Session Initiation Protocol (SIP) INVITE message, wherein:
  - the SIP INVITE message includes an indication that the UE has access to the PLMN via satellite,
  - the indication that the UE has access to the PLMN via satellite identifies a serving satellite radio cell for the UE, and
  - the serving satellite radio cell has a coverage area associated with one or more satellite-transmitted radio beams; and
- means for sending a request to a second network node responsive to receiving the indication that the UE has access to the PLMN via satellite, for location information of the UE, wherein the location information of the UE is used to assist in routing of the SIP INVITE message.

16. The apparatus of claim 15, wherein the SIP INVITE message includes a location of the UE.

17. The apparatus of claim 15, wherein a UE location is determined by the UE.

18. The apparatus of claim 15, wherein a UE location is determined by a network entity and provided to the UE.

19. The apparatus of claim 15, further comprising means for receiving a UE location from a third network node.

20. The apparatus of claim 15, wherein the indication that the UE has access to the PLMN via satellite comprises an indication of 5G satellite access for New Radio (NR) or an indication of 4G satellite access for Long Term Evolution (LTE).

21. The apparatus of claim 15, wherein the means for receiving the SIP INVITE are configured to receive the SIP INVITE for an emergency services call.

22. A non-transitory computer-readable medium storing instructions for supporting satellite wireless access by a user equipment (UE) to a serving public land mobile network (PLMN), the instructions comprising code for:
- receiving from the UE a Session Initiation Protocol (SIP) INVITE message, wherein:
  - the SIP INVITE message includes an indication that the UE has access to the PLMN via satellite,
  - the indication that the UE has access to the PLMN via satellite identifies a serving satellite radio cell for the UE, and
  - the serving satellite radio cell has a coverage area associated with one or more satellite-transmitted radio beams; and
- sending a request to a second network node responsive to receiving the indication that the UE has access to the PLMN via satellite, for location information of the UE, wherein the location information of the UE is used to assist in routing of the SIP INVITE message.

23. The non-transitory computer-readable medium of claim 22, wherein the SIP INVITE message includes a location of the UE.

24. The non-transitory computer-readable medium of claim 22, wherein a UE location is determined by the UE.

25. The non-transitory computer-readable medium of claim 22, wherein a UE location is determined by a network entity and provided to the UE.

26. The non-transitory computer-readable medium of claim 22, wherein the instructions further comprise code for receiving a UE location from a third network node.

27. The non-transitory computer-readable medium of claim 22, wherein the indication that the UE has access to the PLMN via satellite comprises an indication of 5G satellite access for New Radio (NR) or an indication of 4G satellite access for Long Term Evolution (LTE).

28. The non-transitory computer-readable medium of claim 22, wherein code for receiving the SIP INVITE includes code for receiving the SIP INVITE for an emergency services call.

* * * * *